United States Patent
Zhao et al.

(10) Patent No.: US 11,016,269 B2
(45) Date of Patent: May 25, 2021

(54) PHOTOGRAPHING LENS AND PHOTOGRAPHING APPARATUS

(71) Applicant: Samsung Electronics Co., Ltd, Gyeonggi-do (KR)

(72) Inventors: Liefeng Zhao, Gyeonggi-do (KR); Sung-Wook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 15/323,953

(22) PCT Filed: Jul. 2, 2015

(86) PCT No.: PCT/KR2015/006805
§ 371 (c)(1),
(2) Date: Jan. 4, 2017

(87) PCT Pub. No.: WO2016/003211
PCT Pub. Date: Jan. 7, 2016

(65) Prior Publication Data
US 2017/0176720 A1 Jun. 22, 2017

(30) Foreign Application Priority Data
Jul. 4, 2014 (KR) .................. 10-2014-0083899

(51) Int. Cl.
*G02B 13/18* (2006.01)
*G02B 3/02* (2006.01)
(Continued)

(52) U.S. Cl.
CPC ........... *G02B 13/0045* (2013.01); *G02B 9/60* (2013.01); *G02B 27/0025* (2013.01); *G03B 9/06* (2013.01)

(58) Field of Classification Search
CPC ...... G02B 9/60; G02B 13/001; G02B 13/002; G02B 13/0045; G02B 13/18; G02B 27/0025; G03B 9/06; G03B 9/22
(Continued)

(56) References Cited

U.S. PATENT DOCUMENTS 8,179,618 B2   5/2012  Baba
8,625,208 B2   1/2014  Abe
(Continued)

FOREIGN PATENT DOCUMENTS

CN   202837661 U   3/2013
CN   103777326 A   5/2014
(Continued)

OTHER PUBLICATIONS

International Search Report dated Sep. 25, 2015 in connection with International Application No. PCT/KR2015/006805, 3 pages.
(Continued)

*Primary Examiner* — Alicia M Harrington

(57) ABSTRACT

A photographing lens and a photographing apparatus including the same. The photographing lens includes a first lens having a positive refractive power or a negative refractive power and being meniscus shaped; a second lens having a positive refractive power; a third lens having a negative refractive power; a fourth lens having a positive refractive power and having a surface convex toward the image side; and a fifth lens having a negative refractive power, having a surface concave from the image side, and including at least one aspheric surface, wherein the first through fifth lenses are sequentially arranged from the object side toward the image side.

19 Claims, 21 Drawing Sheets

(51) Int. Cl.
*G02B 13/00* (2006.01)
*G02B 9/60* (2006.01)
*G02B 27/00* (2006.01)
*G03B 9/06* (2021.01)

(58) Field of Classification Search
USPC ....... 359/642, 708, 714, 738, 739, 740, 745, 359/746, 754, 763, 770; 348/363
See application file for complete search history.

(56) References Cited

U.S. PATENT DOCUMENTS

| | | | |
|---|---|---|---|
| 8,649,113 | B1 | 2/2014 | Tsai et al. |
| 8,908,288 | B2 | 12/2014 | Hsu et al. |
| 9,250,420 | B2 | 2/2016 | Hsu et al. |
| 9,264,594 | B2 | 2/2016 | Lin et al. |
| 2012/0162769 | A1 | 6/2012 | Suzuki et al. |
| 2013/0050848 | A1 | 2/2013 | Lee |
| 2013/0308206 | A1 | 11/2013 | Hsu et al. |
| 2013/0321932 | A1 | 12/2013 | Hsu et al. |
| 2015/0103225 | A1* | 4/2015 | Hsu .................. G02B 13/0045 348/335 |
| 2015/0103244 | A1* | 4/2015 | Lin ......................... G02B 9/60 348/376 |

FOREIGN PATENT DOCUMENTS

| | | |
|---|---|---|
| EP | 2672306 B1 | 4/2016 |
| JP | 2004271937 | 9/2004 |
| JP | 2006145770 | 6/2006 |
| JP | 2006301308 | 11/2006 |
| JP | 5535023 B2 | 7/2014 |
| JP | 2014123092 A | 7/2014 |
| KR | 1019960003301 | 1/1996 |
| TW | 201403121 A | 1/2014 |
| WO | 2014080382 A1 | 5/2014 |

OTHER PUBLICATIONS

Written Opinion of the International Searching Authority dated Sep. 25, 2015 in connection with International Application No. PCT/KR2015/006805, 5 pages.

Supplementary European Search Report dated Feb. 21, 2018 in connection with European Patent Application No. 15 81 4523.

Communication from a foreign patent office in a counterpart foreign application, China National Intellectual Property Administration, "Notification of the First Office Action," Application No. CN 201580028485.8, dated Sep. 3, 2018, 15 pages.

China National Intellectual Property Administration, "Notification of the Second Office Action," Application No. CN201580028485.8, dated Apr. 3, 2019, 14 pages.

Notice of Non-Final Rejection in connection with Korean Application No. 10-2014-0083899 dated Oct. 16, 2020, 10 pages.

Examination report in connection with Indian Application No. 201617032566 dated Aug. 14, 2020, 6 pages.

* cited by examiner

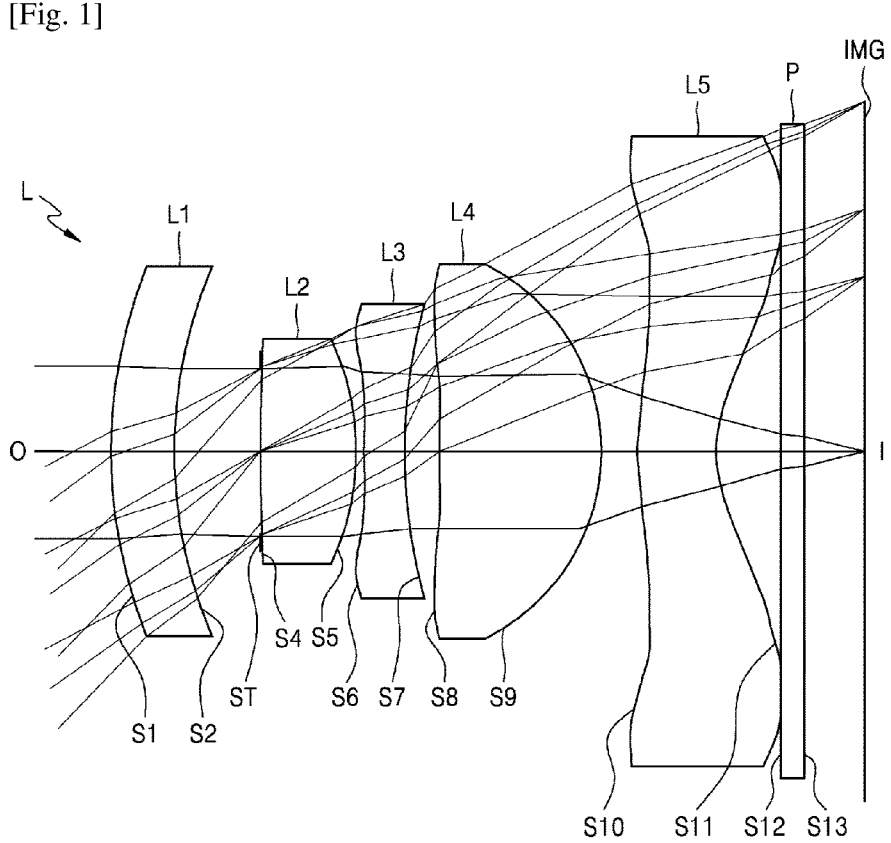
[Fig. 1]

[Fig. 2]
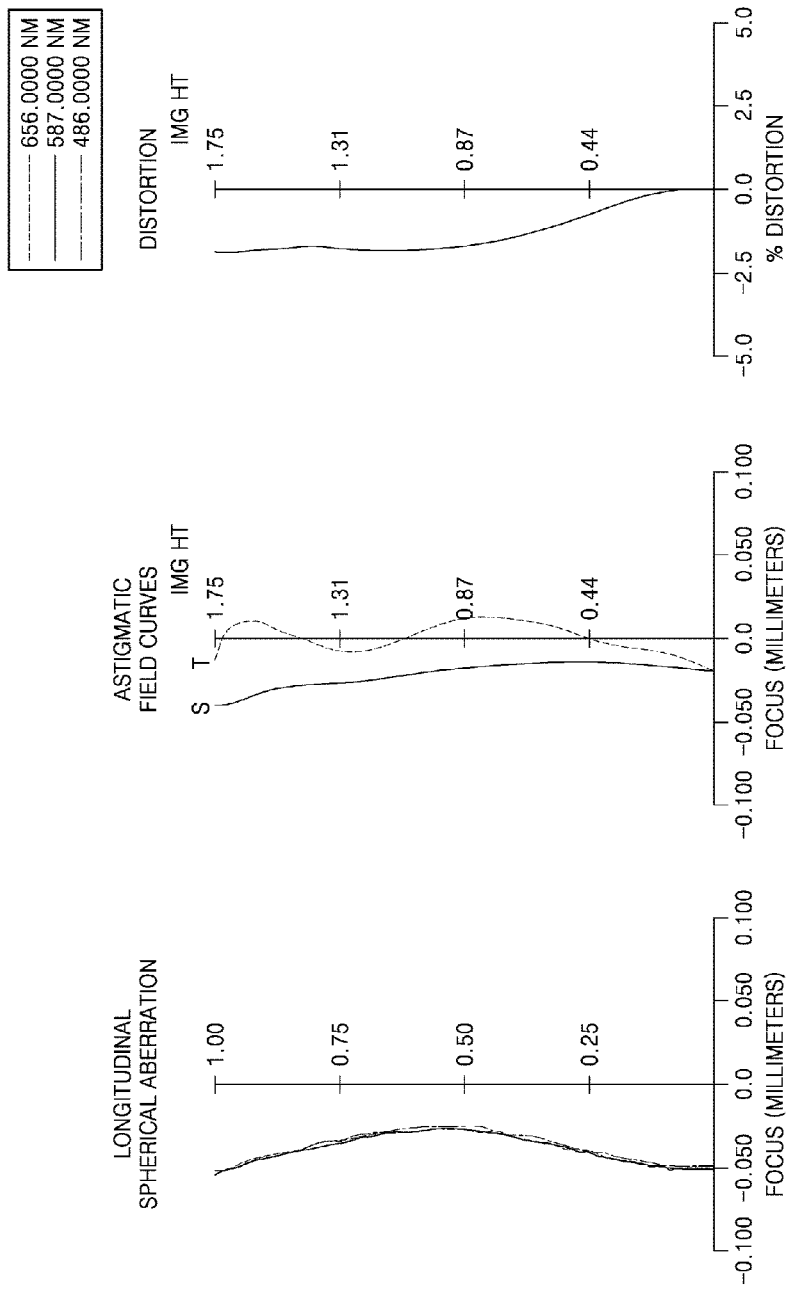

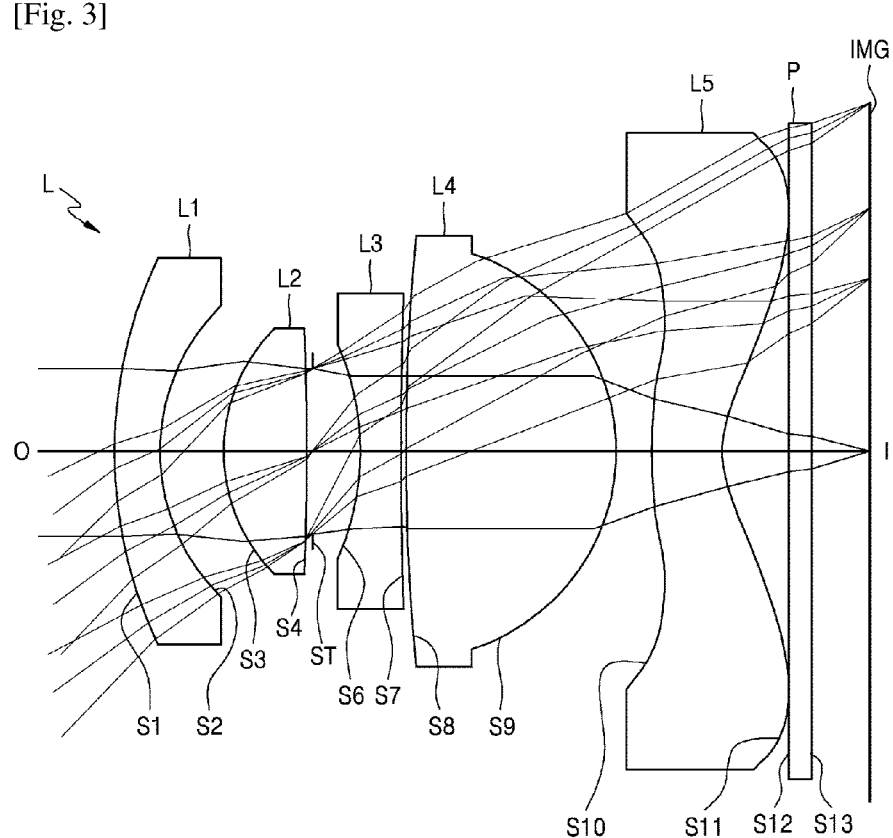
[Fig. 3]

[Fig. 4]
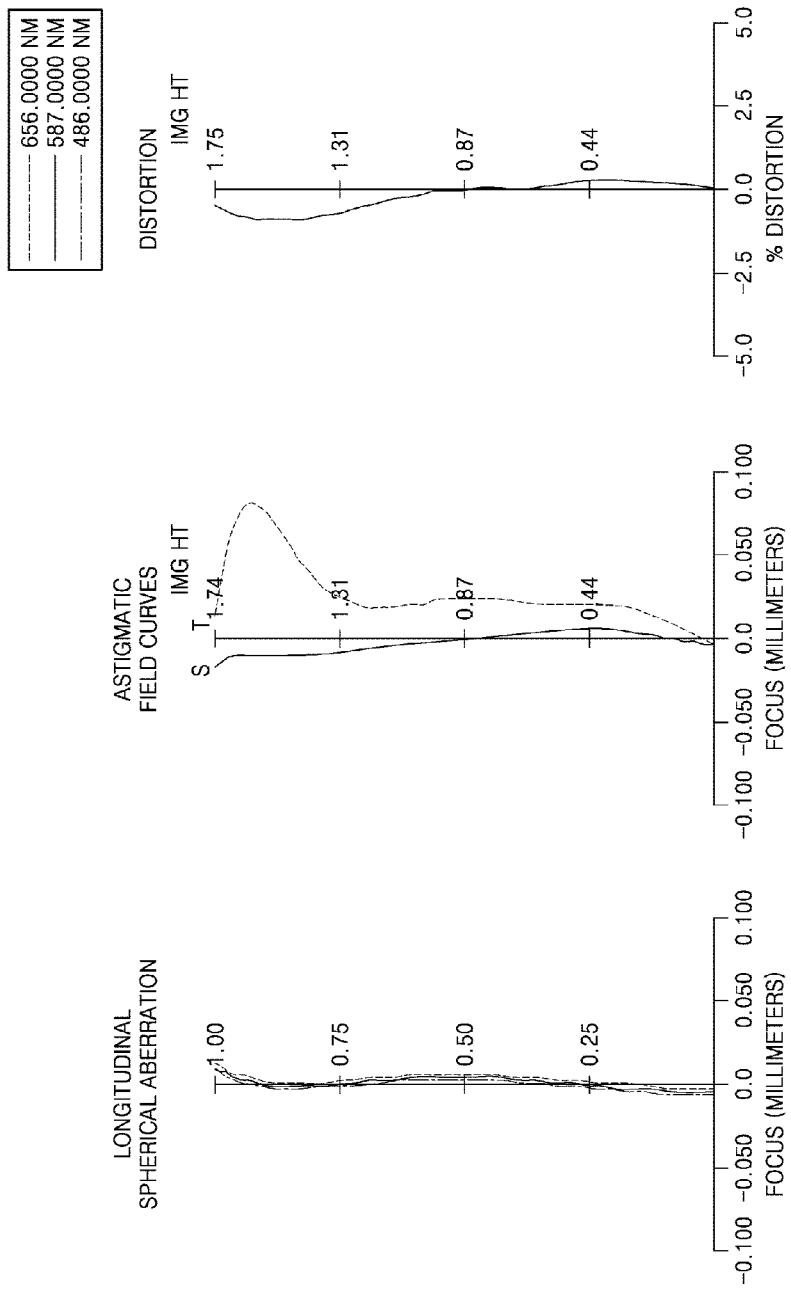

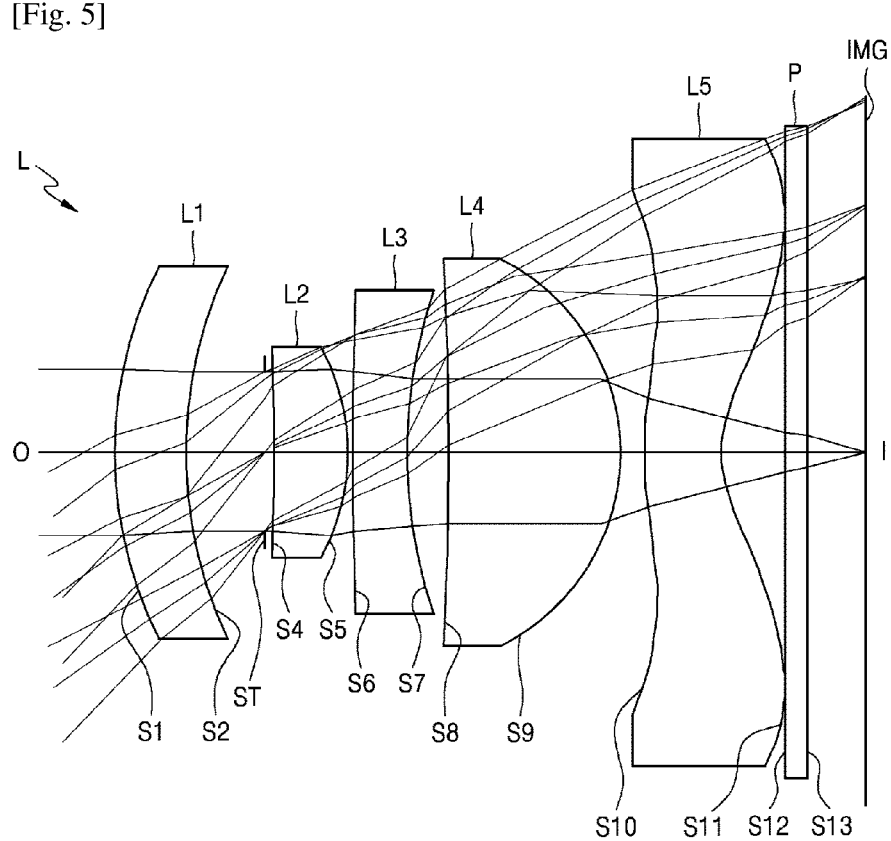
[Fig. 5]

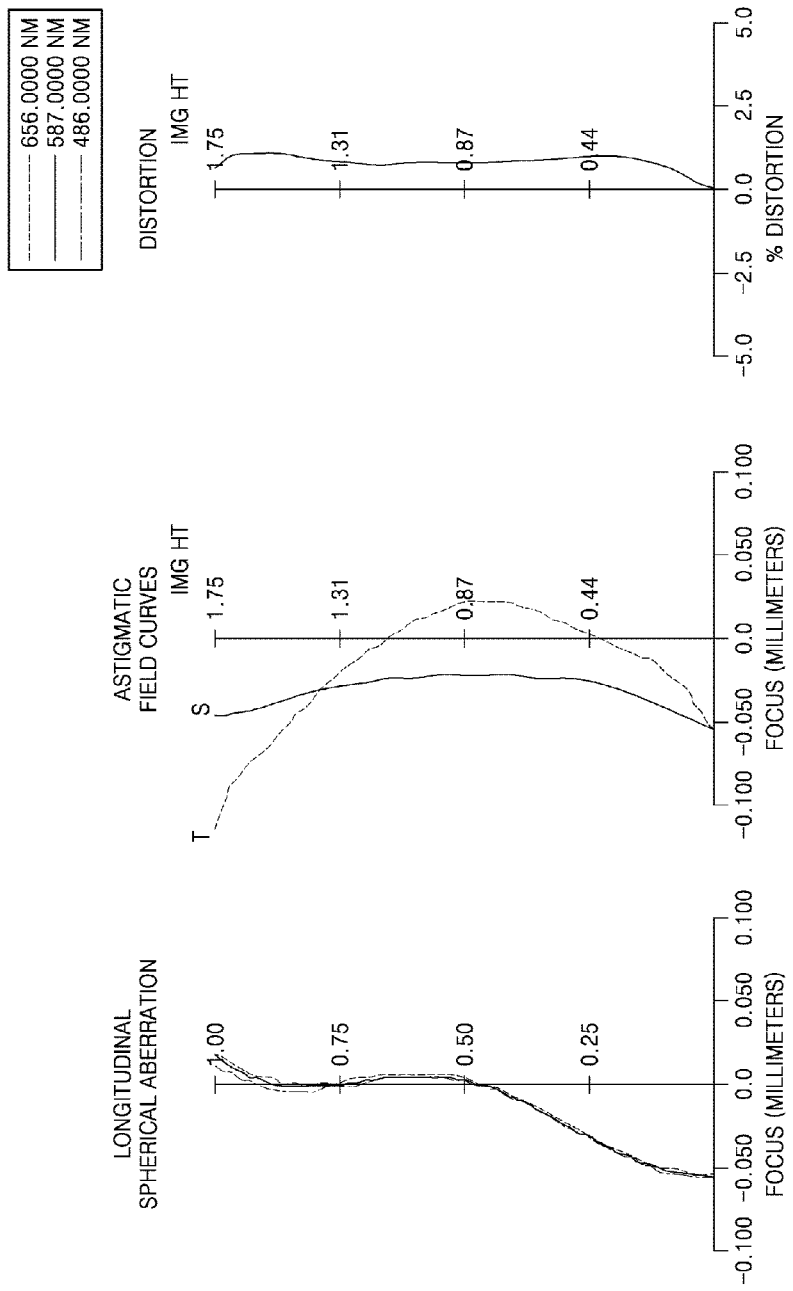

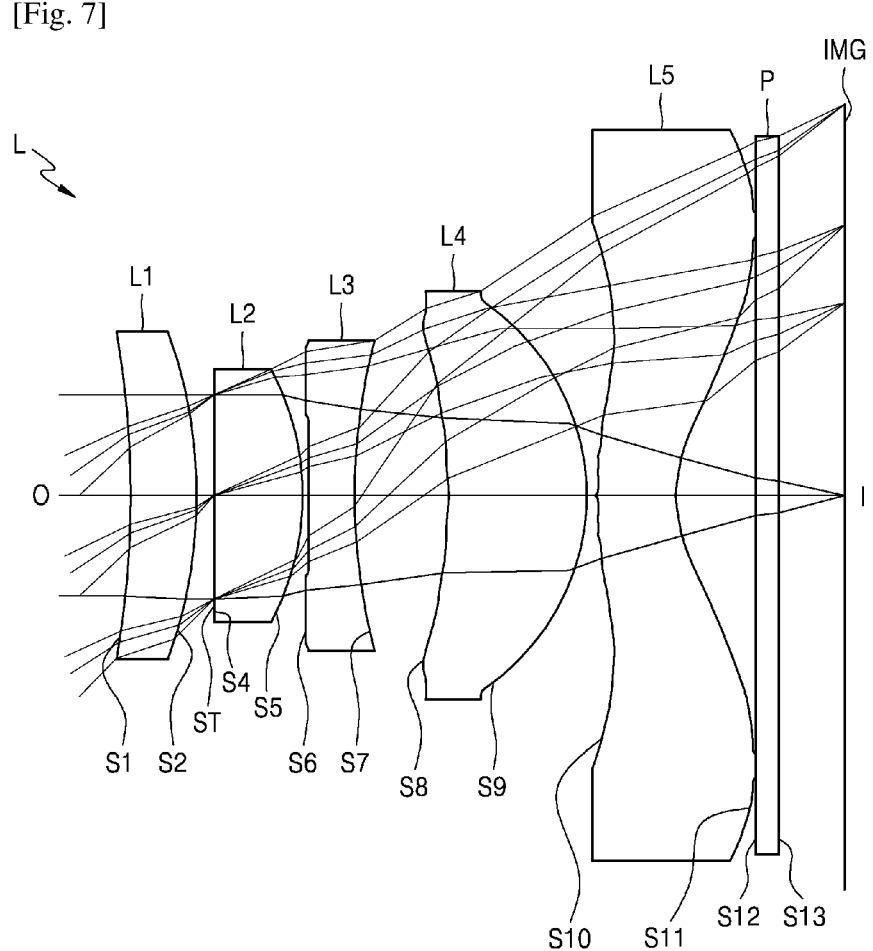
[Fig. 7]

[Fig. 8]
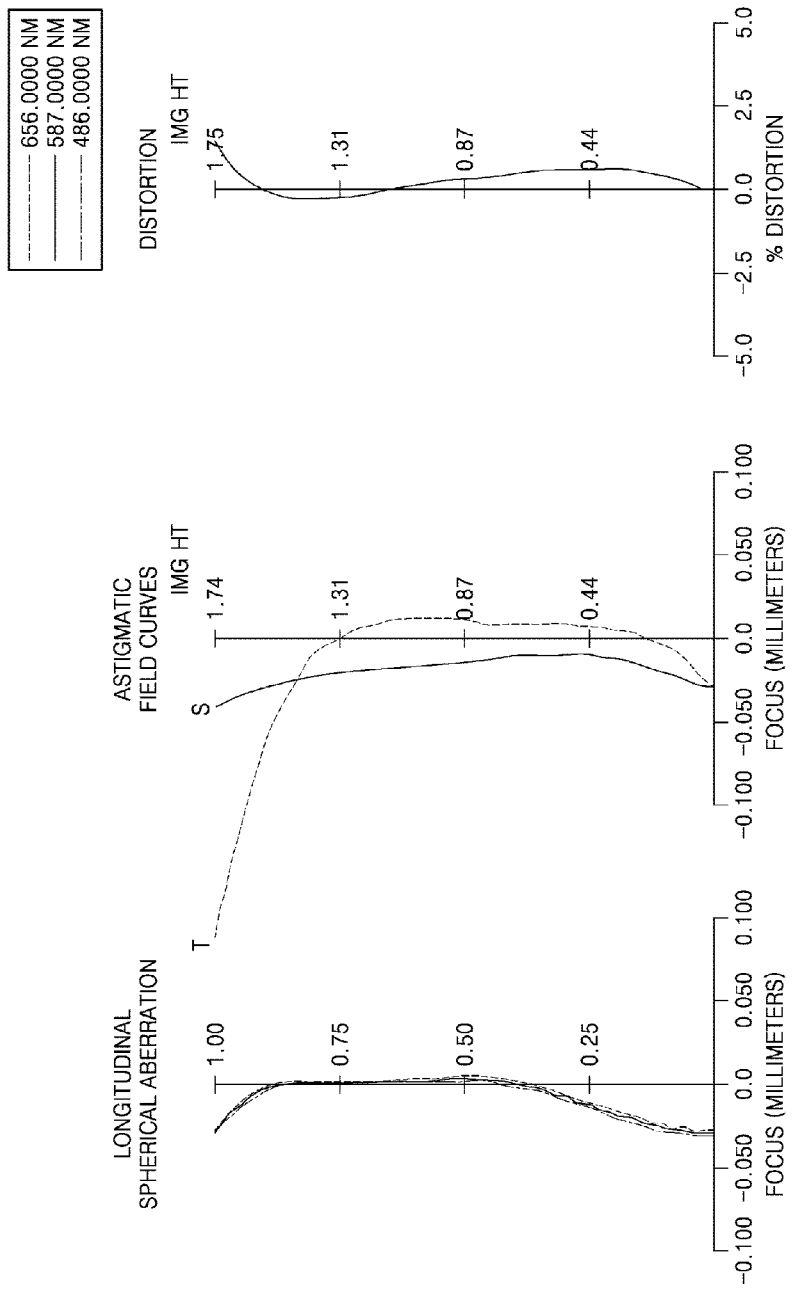

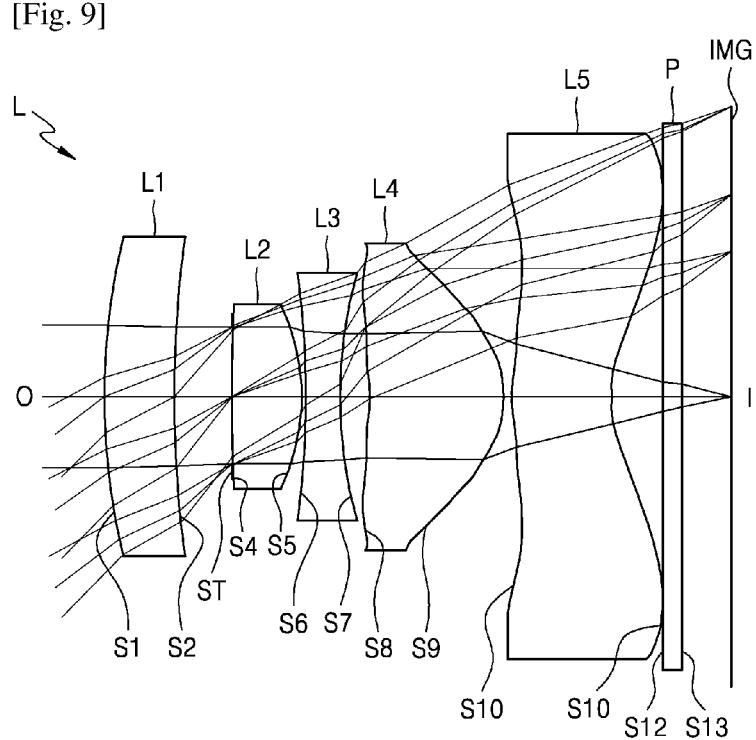
[Fig. 9]

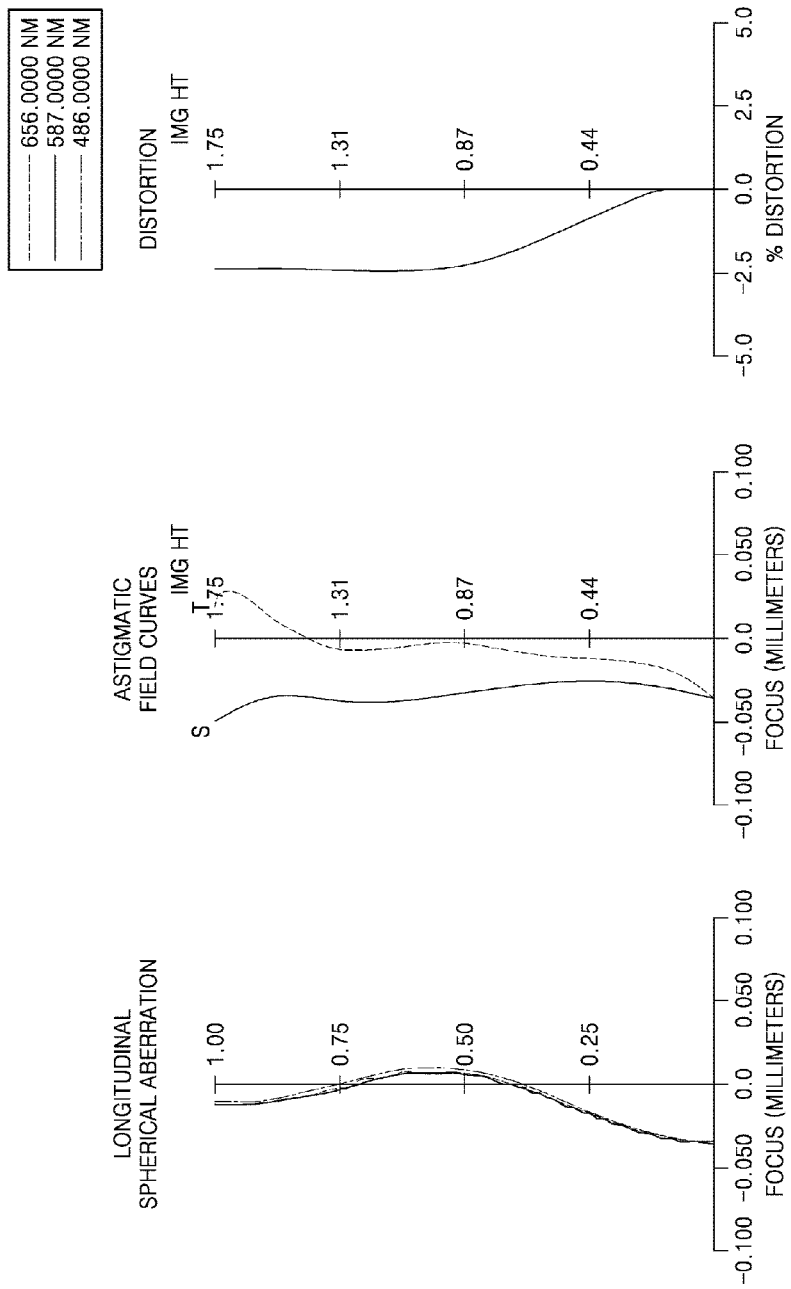
[Fig. 10]

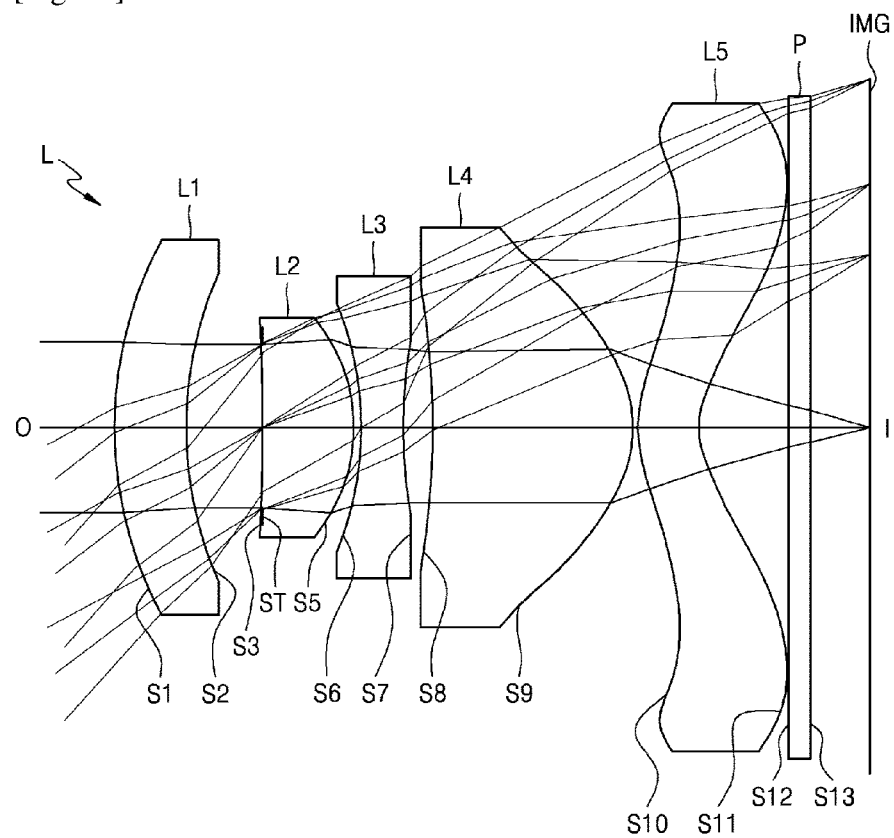
[Fig. 11]

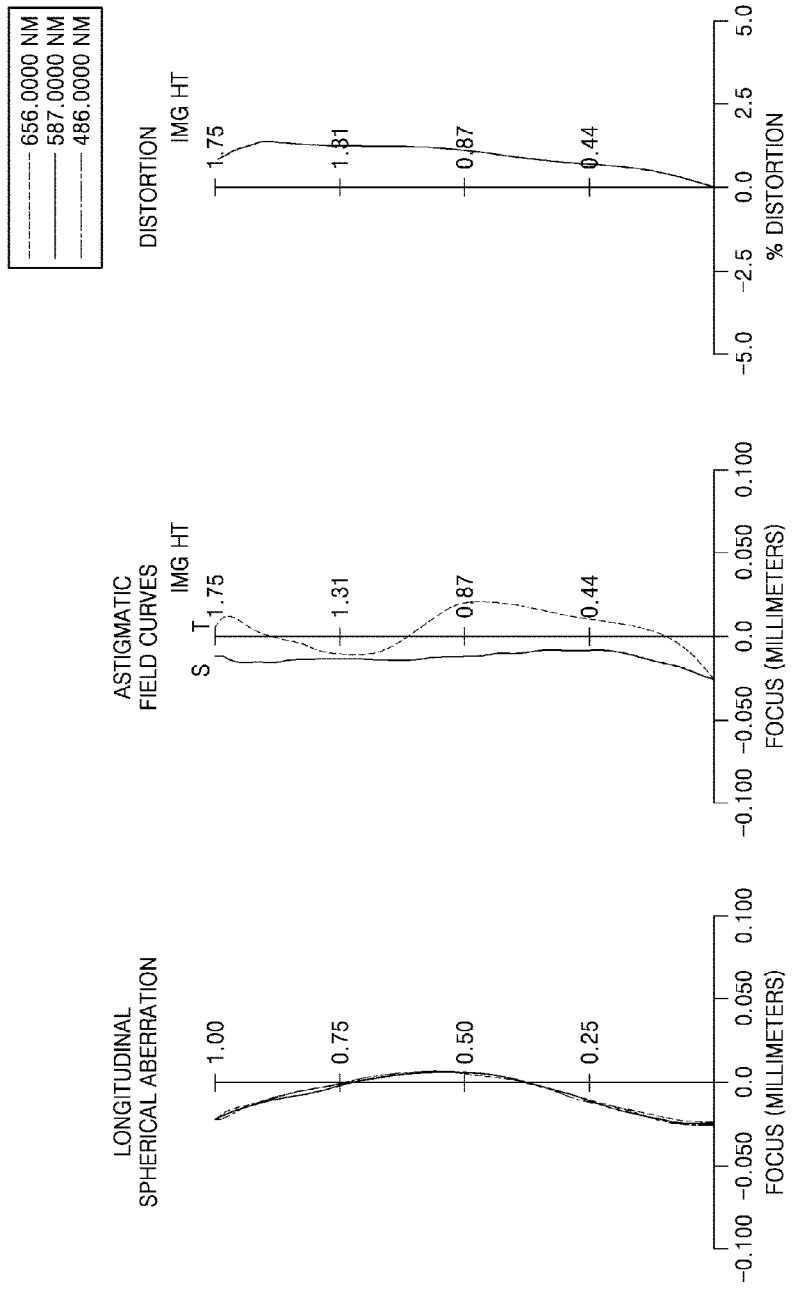
[Fig. 12]

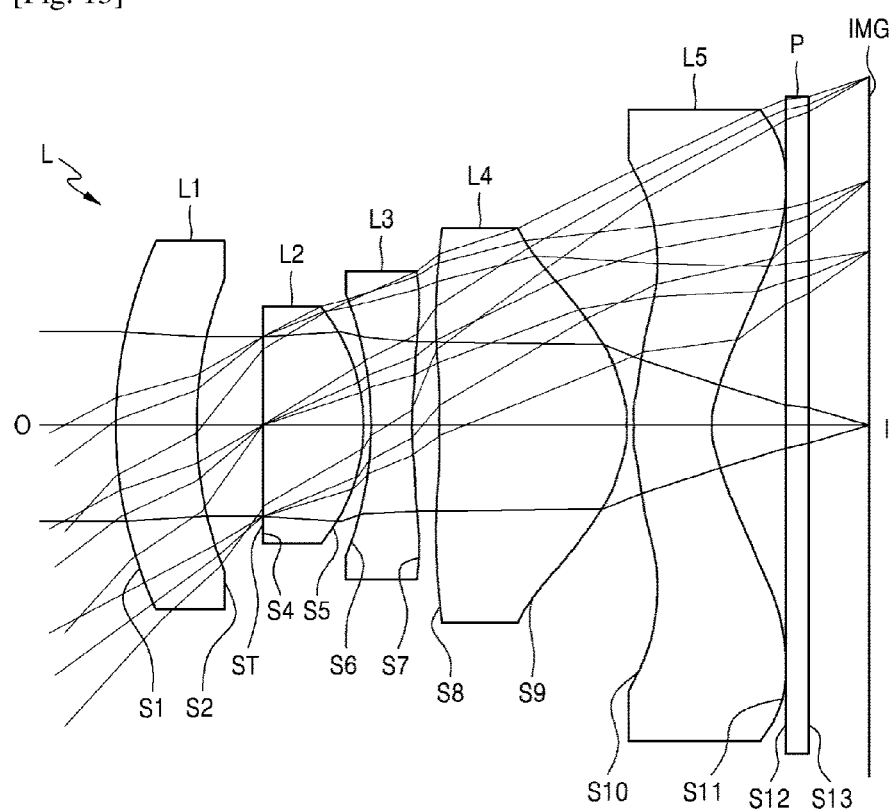
[Fig. 13]

[Fig. 14]
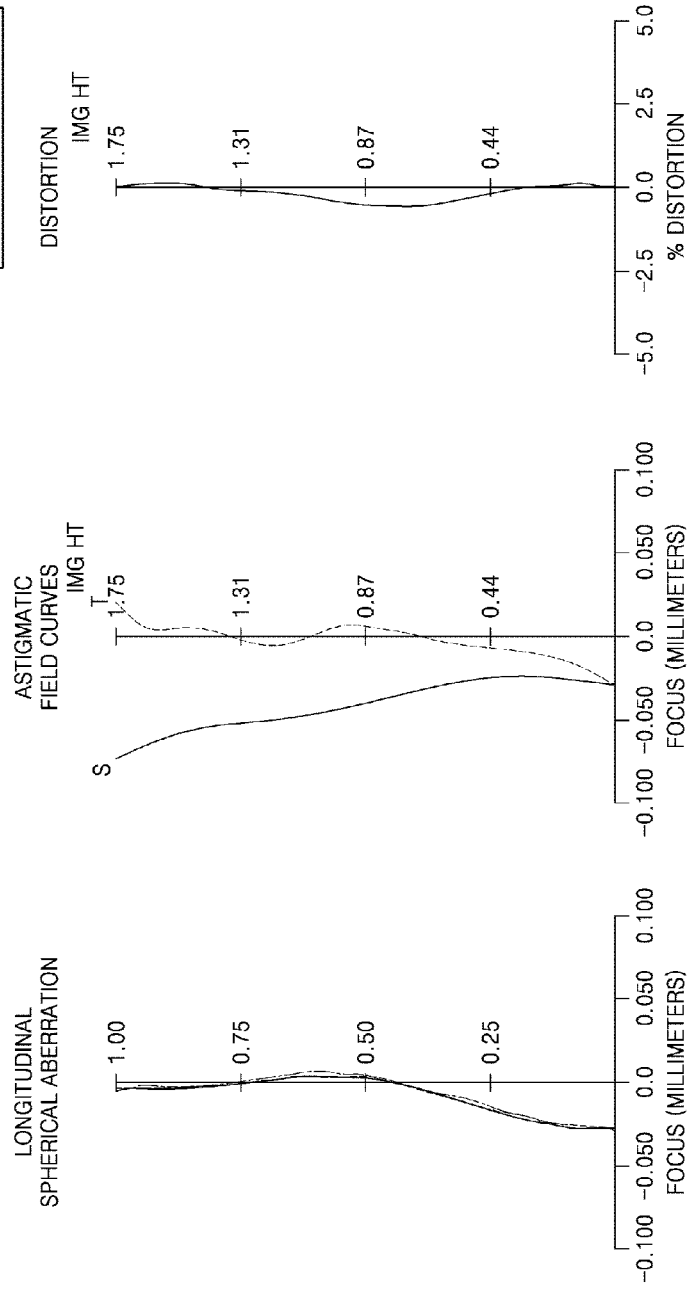

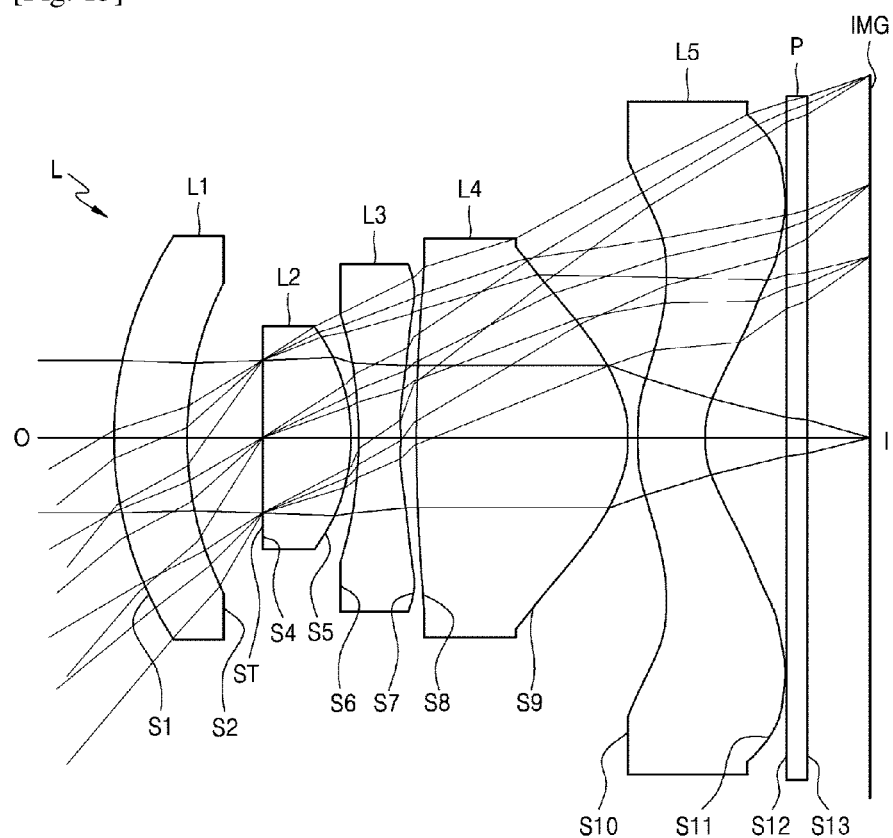
[Fig. 15]

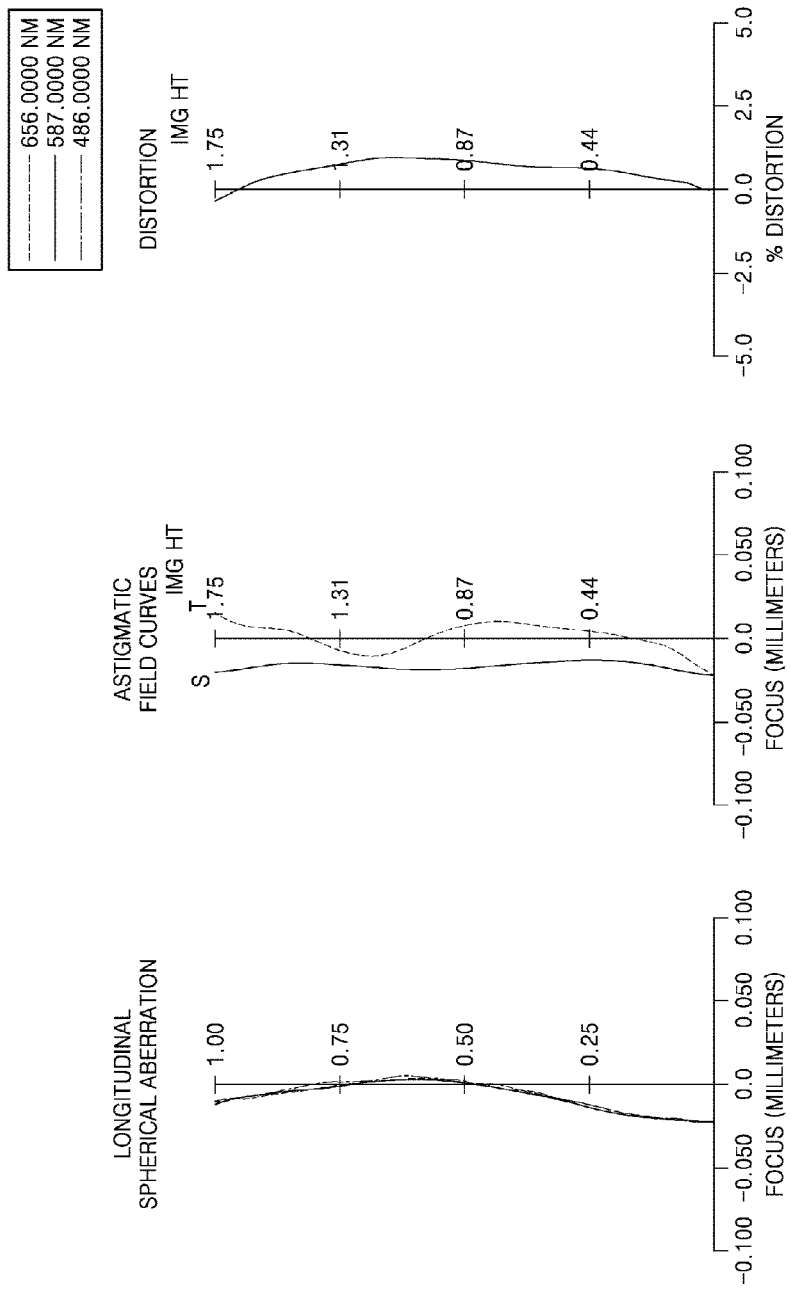
[Fig. 16]

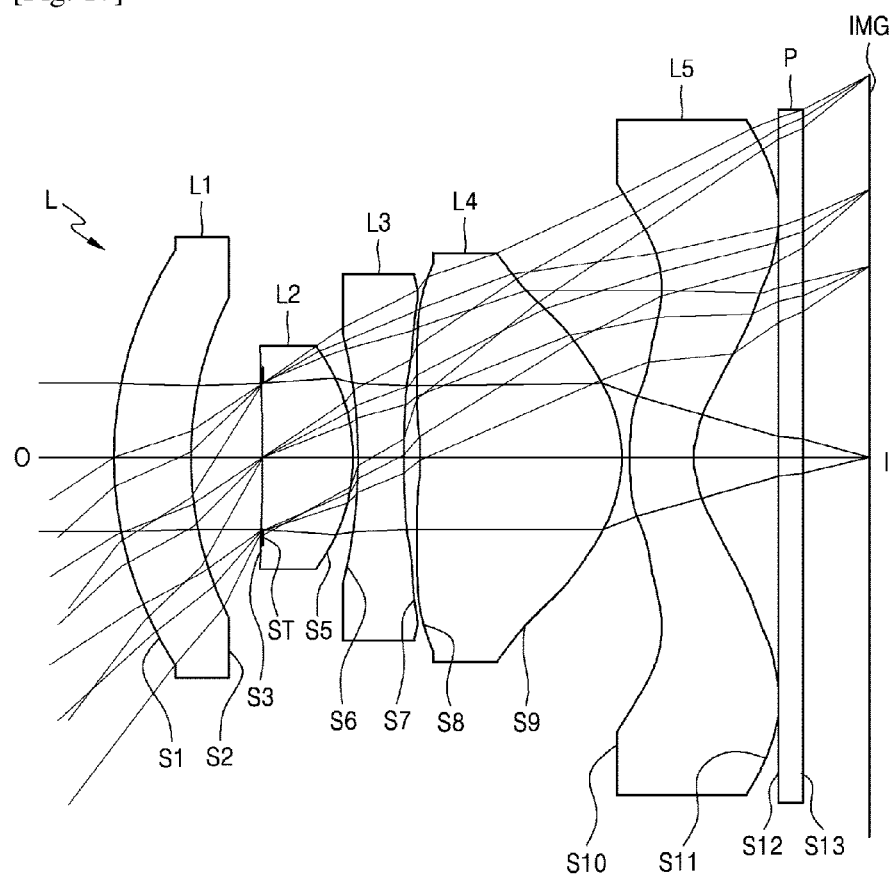
[Fig. 17]

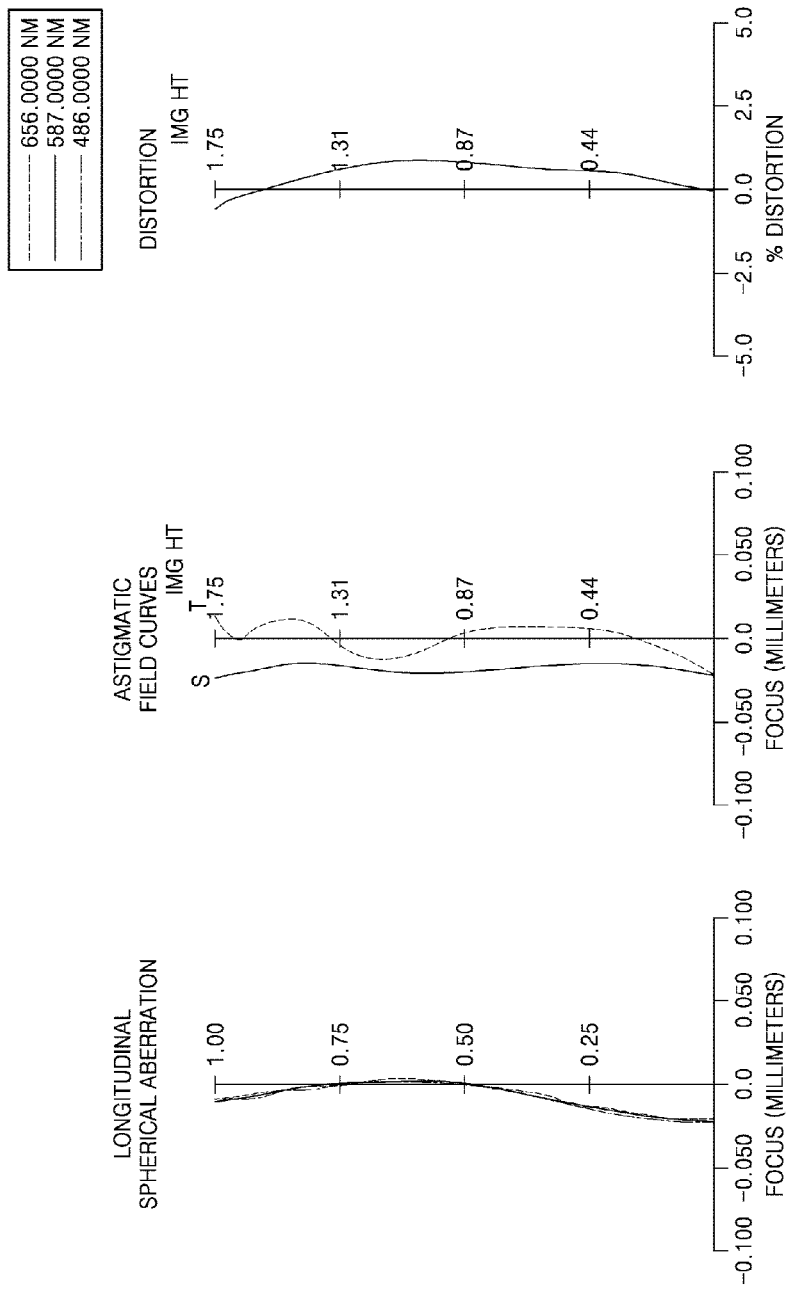

[Fig. 19]
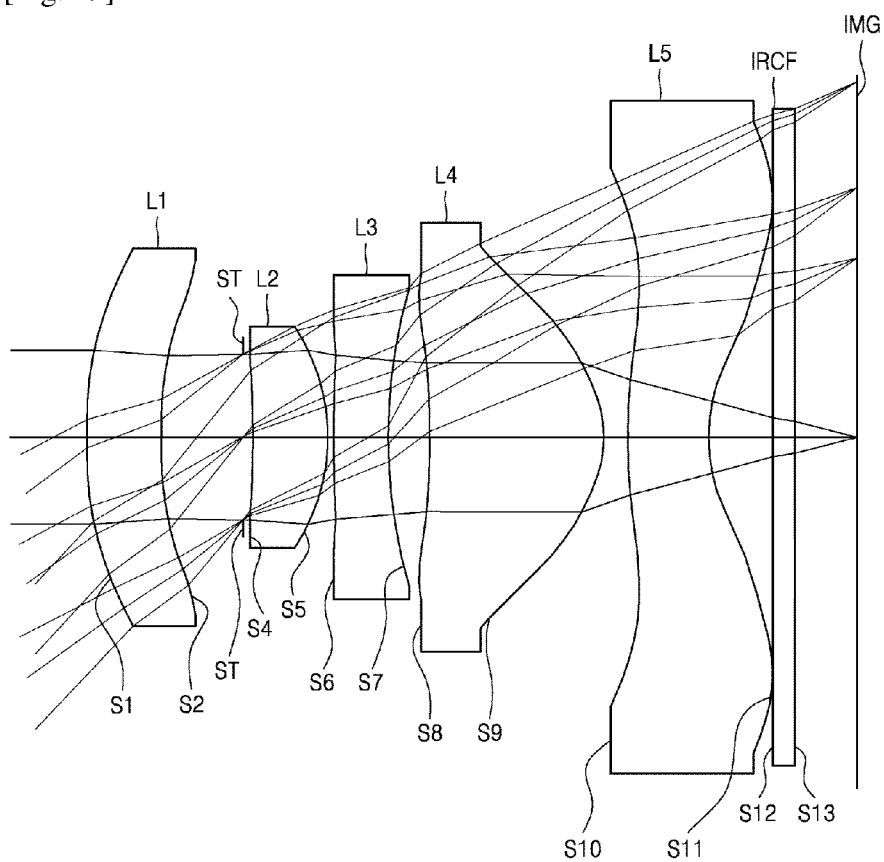

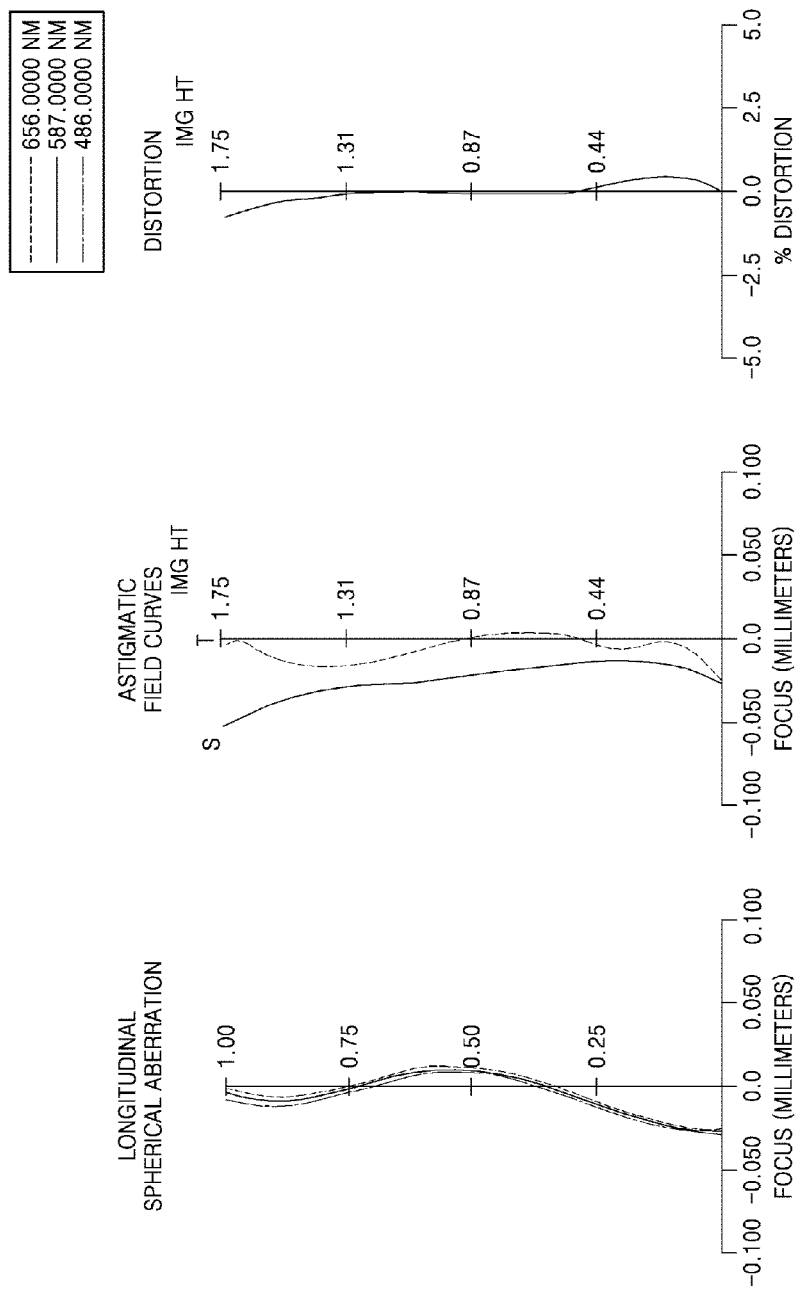

[Fig. 21]
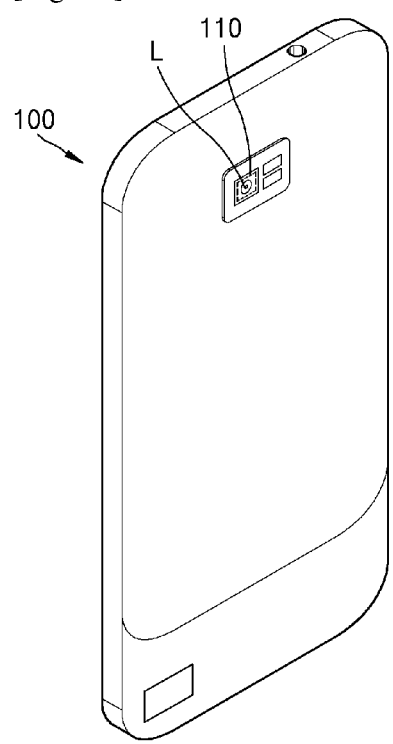

PHOTOGRAPHING LENS AND PHOTOGRAPHING APPARATUS

CROSS-REFERENCE TO RELATED APPLICATION(S)

The present application claims priority under 35 U.S.C. § 365 to International Patent Application No. PCT/KR2015/006805 filed Jul. 2, 2015, entitled "PHOTOGRAPHING LENS AND PHOTOGRAPHING APPARATUS", and, through International Patent Application No. PCT/KR2015/006805, to Korean Patent Application No. 10-2014-0083899 filed Jul. 4, 2014, each of which are incorporated herein by reference into the present disclosure as if fully set forth herein.

TECHNICAL FIELD

One or more exemplary embodiments relate to a compact photographing lens having a wide field of view photographing lens and a photographing apparatus including the same.

BACKGROUND ART

Photographing apparatuses employing solid imaging devices, such as a charge-coupled device (CCD) type image sensor and a complementary metal-oxide semiconductor (CMOS) type image sensor, are being widely used. Examples of such photographing apparatuses include digital still cameras, video cameras, interchangeable-lens cameras, etc. Furthermore, since a photographing apparatus employing a solid imaging device may easily be miniaturized, photographing apparatuses employing solid imaging devices are applied to small information terminals including mobile phones. Users demand high performance from photographing apparatuses, such as a high resolving power and a wide field of view. Furthermore, user expertise in using cameras is continuously improving.

DISCLOSURE OF INVENTION

Technical Problem

Along with miniaturization and increased resolution of imaging devices, high resolving power and high performance of photographing lenses are demanded. However, it is difficult to provide a photographing lens which has the high performance desired by a user when using four or five photographing lenses, and it is difficult to mount an imaging device with satisfactory optical characteristics and aberration characteristics in a slim portable device.

Solution to Problem

One or more exemplary embodiments include a compact photographing lens having wide field of view photographing lens.

One or more exemplary embodiments include a photographing apparatus including a compact photographing lens having a wide field of view photographing lens.

Additional aspects will be set forth in part in the description which follows and, in part, will be apparent from the description, or may be learned by practice of the presented exemplary embodiments.

According to one or more exemplary embodiments, a photographing lens includes a first lens having a positive refractive power or a negative refractive power and being meniscus shaped; a second lens having a positive refractive power; a third lens having a negative refractive power; a fourth lens having a positive refractive power and having a surface convex toward the image side; and a fifth lens having a negative refractive power, having a surface concave from the image side, and including at least one aspheric surface, wherein the first through fifth lenses are sequentially arranged from the object side toward the image side, and the mathematical expression below is satisfied:

$1.0 < \text{APE-}L5\text{-MAX} < 6.0$ (mm)

$80 < \text{FoV} < 160$ (degree)

$1.0 < \text{EFL/EPD} < 2.0$ $\text{IND-}L5 > 1.6$ $Vd\text{-}L5 < 30,$ <mathematical expression> here, APE-L5-MAX denotes a diameter of a maximum effective aperture of a fifth lens, FoV denotes a field of view of the photographing lens, EFL denotes an effective focal length of the photographing lens, and EPD denotes a diameter of an entrance pupil of the photographing lens.

The photographing lens further includes an iris arrange at a location between the first lens and the third lens.

The below mathematical expression is satisfied:

$|F1|/\text{EFL} > 1,$ <mathematical expression> here, F1 denotes a focal length of the first lens.
The below mathematical expression is satisfied:

$F2/\text{EFL} < 5,$ <mathematical expression> here, F2 denotes a focal length of the second lens.
The below mathematical expression is satisfied:

$T3/T2 < 1$ <mathematical expression> here, T2 denotes thickness of the second lens on the optical axis, and
T3 denotes thickness of the third lens on the optical axis.
The below mathematical expression is satisfied:

$Vd3/Vd2 < 1,$ <mathematical expression> here, Vd denotes the Abbe's number of the second lens, and
Vd3 denotes the Abbe's number of the third lens.
The below mathematical expression is satisfied:

$|R41/R42| > 1,$ <mathematical expression> here, R41 denotes curvature radius of the object side surface of the fourth lens, and
R42 denotes curvature radius of the image side surface of the fourth lens.

The fifth lens includes the object side surface convex toward the object side nearby the optical axis and the image side surface concave from the image side around the optical axis.

The image side surface of the fifth lens includes at least one inflection point.

Each of the first through fifth lenses includes at least one aspheric surface.

The first through fifth lenses are plastic lenses.

The below mathematical expression is satisfied:

$$\text{IND-}L3 > 1.6$$

$$Vd\text{-}L3 < 30, \qquad \text{<mathematical expression>}$$

here, IND-L3 denotes refractive index of the third lens, and

Vd-L3 denotes the Abbe's number of the third lens.

The below mathematical expression is satisfied:

$$2.0 < \text{APE-}L5\text{-MAX} < 4.5 \text{ (mm)}. \qquad \text{<mathematical expression>}$$

The first lens may have a meniscus shape being convex toward the object side or concave toward the image side.

According to one or more exemplary embodiments, a photographing apparatus includes a photographing lens and an image sensor for receiving an image formed by the photographing lens and converting the image into electric image signals, wherein the photographing lens includes a first lens having a positive refractive power or a negative refractive power and being meniscus shaped; a second lens having a positive refractive power; a third lens having a negative refractive power; a fourth lens having a positive refractive power and having a surface convex toward the image side; and a fifth lens having a negative refractive power, having a surface concave from the image side, and including at least one aspheric surface, the first through fifth lenses are sequentially arranged from the object side toward the image side, and the mathematical expression below is satisfied:

$$1.0 < \text{APE-}L5\text{-MAX} < 6.0 \text{ (mm)}$$

$$80 < \text{FoV} < 160 \text{ (degree)}$$

$$1.0 < \text{EFL/EPD} < 2.0$$

$$\text{IND-}L5 > 1.6$$

$$Vd\text{-}L5 < 30, \qquad \text{<mathematical expression>}$$

here, APE-L5-MAX denotes a diameter of a maximum effective aperture of a fifth lens, FoV denotes a field of view of the photographing lens, EFL denotes an effective focal length of the photographing lens, and EPD denotes a diameter of an entrance pupil of the photographing lens.

The photographing apparatus further includes an iris arrange at a location between the first lens and the third lens.

The below mathematical expression is satisfied:

$$|F1|/\text{EFL} > 1, \qquad \text{<mathematical expression>}$$

here, F1 denotes a focal length of the first lens.

The below mathematical expression is satisfied:

$$F2/\text{EFL} < 5, \qquad \text{<mathematical expression>}$$

here, F2 denotes a focal length of the second lens.

Advantageous Effects of Invention

A photographing lens according to an embodiment may be applied to a photographing apparatus employing an image sensor. a photographing lens according to an embodiment may be applied to various types of photographing apparatuses, such as a digital camera, an interchangeable-lens camera, a video camera, a mobile phone camera, and a small mobile device camera.

BRIEF DESCRIPTION OF DRAWINGS

These and/or other aspects will become apparent and more readily appreciated from the following description of the exemplary embodiments, taken in conjunction with the accompanying drawings in which:

FIG. 1 is a diagram showing a photographing lens L according to an embodiment;

FIG. 2 is a diagram showing longitudinal spherical aberration, astigmatic field curves, and distortion of a photographing lens according to the first embodiment;

FIG. 3 is a diagram showing a photographing lens according to a second embodiment, where design data according to the second embodiment is shown below;

FIG. 4 is a diagram showing longitudinal spherical aberration, astigmatic field curves, and distortion of a photographing lens according to the second embodiment;

FIG. 5 is a diagram showing a photographing lens according to a third embodiment, where design data according to the third embodiment is shown below;

FIG. 6 is a diagram showing longitudinal spherical aberration, astigmatic field curves, and distortion of a photographing lens according to the third embodiment;

FIG. 7 is a diagram showing a photographing lens according to a fourth embodiment, where design data according to the fourth embodiment is shown below;

FIG. 8 is a diagram showing longitudinal spherical aberration, astigmatic field curves, and distortion of a photographing lens according to the fourth embodiment;

FIG. 9 is a diagram showing a photographing lens according to a fifth embodiment, where design data according to the fifth embodiment is shown below;

FIG. 10 is a diagram showing longitudinal spherical aberration, astigmatic field curves, and distortion of a photographing lens according to the fifth embodiment;

FIG. 11 is a diagram showing a photographing lens according to a sixth embodiment, where design data according to the sixth embodiment is shown below;

FIG. 12 is a diagram showing longitudinal spherical aberration, astigmatic field curves, and distortion of a photographing lens according to the sixth embodiment;

FIG. 13 is a diagram showing a photographing lens according to a seventh embodiment, where design data according to the seventh embodiment is shown below;

FIG. 14 is a diagram showing longitudinal spherical aberration, astigmatic field curves, and distortion of a photographing lens according to the seventh embodiment;

FIG. 15 is a diagram showing a photographing lens according to an eighth embodiment, where design data according to the eighth embodiment is shown below;

FIG. 16 is a diagram showing longitudinal spherical aberration, astigmatic field curves, and distortion of a photographing lens according to the eighth embodiment;

FIG. 17 is a diagram showing a photographing lens according to a ninth embodiment, where design data according to the ninth embodiment is shown below;

FIG. 18 is a diagram showing longitudinal spherical aberration, astigmatic field curves, and distortion of a photographing lens according to the ninth embodiment;

FIG. 19 is a diagram showing a photographing lens according to a tenth embodiment, where design data according to the tenth embodiment is shown below;

FIG. 20 is a diagram showing longitudinal spherical aberration, astigmatic field curves, and distortion of a photographing lens according to the tenth embodiment; and FIG. 21 is a diagram showing an example of a photographing apparatus employing a photographing lens according to an embodiment.

MODE FOR THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram showing a photographing lens L according to an embodiment.

The photographing lens L includes a first lens L1 having a negative refractive power or a positive refractive power, a second lens L2 having a positive refractive power, a third lens L3 having a negative refractive power, a fourth lens L4 having a positive refractive power, and a fifth lens L5 having a negative refractive power, which are arranged from the object side O to the image side I in the order.

An iris ST may be arranged at a location between the object side O of the first lens L1 and the third lens L3. For example, the iris ST may be arranged between the first lens L1 and the second lens L2. Alternatively, the iris ST may be arranged at an object side surface S3 of the second lens L2, for example. Alternatively, the iris ST may be arranged between the second lens L2 and the third lens L3. By incorporating the iris ST such that the diameter of an aperture for passing light is adjustable, the size of a photographing lens may be reduced.

The first lens L1 may be a meniscus lens, for example. The first lens L1 may include an object side surface S1 convex toward the object side O or an image side surface S2 convex toward the image side I. The second lens L2 may include an image side surface S4 convex toward the image side I, for example. The second lens L2 may be a biconvex lens or a meniscus lens.

The third lens L3 may include an image side surface S concave towar the image side I, for example. The third lens L3 may be a double-concave lens or a meniscus lens.

The fourth lens L4 may include an image side surface S8 convex toward the image side I, for example. The fourth lens L4 may be a biconvex lens or a meniscus lens.

The fifth lens L5 may include an image side surface S10 concave toward the image side I around an optical axis. The image side surface S10 of the fifth lens L5 may include at least one inflection point. Here, an inflection point refers to a point at which the sign of a curvature radius is switched from (+) to (−) or vice versa. The image side surface S10 of the fifth lens L5 may have a shape that, for example, is concave around the optical axis but convex as far away from the optical axis. The fifth lens L5 may include an object side surface S9 that is convex toward the object side O around the optical axis. The object side surface S9 of the fifth lens L5 may include at least one inflection point.

An image of an object may pass through a first lens, a second lens, a third lens, a fourth lens, and a fifth lens and may then be incident to an image plane IMG. The image plane IMG may be an imaging device surface or a surface of an image sensor.

At least one optical filter P may be arranged between the fifth lens L5 and an image plane or an image sensor IMG. The optical filter may include at least one of a low pass filter, an IR-cut filter, and a cover glass, for example. If an IR-cut filter is arranged as the optical filter, visible rays may be transmitted and infrared rays may be emitted to outside, thereby preventing infrared rays from being incident to an imaging surface. However, a photographing lens may be configured without an optical filter.

The first through fifth lenses L1, L2, L3, L4, and L5 may include at least one aspheric lens. For example, each of the first through fifth lenses L1, L2, L3, L4, and L5 may include at least one aspheric surface. For example, each of the first through fifth lenses L1, L2, L3, L4, and L5 may be a double aspheric lens. Therefore, a compact and a high resolution photographing lens may be embodied.

At least one from among the first through fifth lenses L1, L2, L3, L4, and L5 may be a plastic lens. For example, the first through fifth lenses L1, L2, L3, L4, and L5 may be plastic lenses. Since at least one from among the first through fifth lenses L1, L2, L3, L4, and L5 is formed as a plastic lens, the overall manufacturing cost may be reduced and aspheric surfaces may be easily formed.

A photographing lens L according to an embodiment may satisfy the mathematical expressions below.

$$1.0 < \text{APE-}L5\text{-MAX} < 6.0 \text{ (mm)} \qquad \text{<Expression 1>}$$

$$80 < \text{FoV} < 160 \text{ (degree)} \qquad \text{<1 Expression 2>}$$

$$1.0 < \text{EFL/EPD} < 2.0 \qquad \text{<Expression 3>}$$

Here, APE-L5-MAX denotes a diameter of a maximum effective aperture of a fifth lens, FoV denotes a field of view of the photographing lens, EFL denotes an effective focal length of the photographing lens, and EPD denotes a diameter of an entrance pupil of the photographing lens.

The effective aperture of the photographing lens may indicate the size of an area of the lens through which light passes.

When a photographing lens satisfies the Mathematical Expression 1, the photographing lens may be miniaturized. The Mathematical Expression 2 shows a field of view, where a photographing lens according to an embodiment may have a wide field of view.

When a photographing lens satisfies the Expression 3, a bright photographing lens may be embodied.

A photographing lens L according to an embodiment may satisfy the Expressions below.

$$\text{IND-}L5 > 1.6 \qquad \text{<Expression 4>}$$

$$Vd\text{-}L5 < 30 \qquad \text{<Expression 5>}$$

Here, IND-L5 denotes refractive index of the fifth lens and Vd-L5 denotes the Abbe's number of the fifth lens. When the fifth lens satisfies the Expression 4 and the Expression 5, chromatic aberration may be easily corrected, and thus a high resolution image may be formed.

A photographing lens according to an embodiment may satisfy the Expression below.

$$2.0 < \text{APE-}L5\text{-MAX} < 4.5 \text{ (mm)} \qquad \text{<Expression 6>}$$

When a photographing lens satisfies the Expression 6, the photographing lens may be miniaturized.

A photographing lens according to an embodiment may satisfy the Expression below.

$$|F1|/\text{EFL} > 1 \qquad \text{<Expression 7>}$$

Here, F1 denotes a focal length of a first lens.

When a photographing lens satisfies the Expression 7, refractive power of the first lens L1 increases, thereby reducing curvature of field and increasing ambient light.

The photographing lens L may satisfy the Expression below.

$$F2/EFL < 5 \qquad \text{<Expression 8>}$$

Here, F1 denotes a focal length of a second lens.

When a photographing lens satisfies the Expression 8, the photographing lens may be miniaturized.

The photographing lens L may satisfy the Expression below.

$$T3/T2 < 1 \qquad \text{<Expression 9>}$$

Here, T2 denotes thickness of a second lens on the optical axis, whereas T3 denotes thickness of a third lens on the optical axis.

The photographing lens L may satisfy the Expression below.

$$Vd3/Vd2 < 1 \qquad \text{<Expression 10>}$$

Here, Vd2 denotes the Abbe's number of a second lens, whereas Vd3 denotes the Abbe's number of a third lens.

Since the second lens has the Abbe's number greater than that of the third lens, chromatic aberration may be easily corrected.

The photographing lens L may satisfy the Expression below.

$$|R41/R42| > 1 \qquad \text{<Expression 11>}$$

Here, R41 denotes a curvature radius of the object side surface of a fourth lens, whereas R42 denotes a curvature radius of the image side surface of the fourth lens.

Since the curvature radius of the object side surface of a fourth lens is greater than the curvature radius of the image side surface of the fourth lens, astigmatic field curve may be reduced.

The photographing lens L may satisfy the Expression below.

$$IND\text{-}L3 > 1.6 \qquad \text{<Expression 12>}$$

$$Vd\text{-}L3 < 30 \qquad \text{<Expression 13>}$$

Here, IND-L3 denotes refractive index of a third lens, and Vd-L3 denotes the Abbe's number of the third lens.

Meanwhile, an aspheric surface employed by a photographing lens according to an embodiment will be defined below.

The shape of an aspheric surface may be defined as shown in Expression 14 below, where the optical axis direction refers the x-axis, a direction perpendicular to the optical axis direction refers the y-axis, and light traveling direction refers a positive direction along the optical axis. Here, x denotes a distance from the vertex of a lens in the optical axis direction, y denotes a distance in a direction perpendicular to the optical axis, K denotes the conic constant, An denotes an aspheric coefficient, and C denotes the inverse of a curvature radius at the vertex of the lens.

$$x = \frac{Cy^2}{1 + \sqrt{1 - (K+1)C^2 y^2}} + \sum_{n=1}^{6} A_n y^{2(n+1)} \qquad \text{<Expression 14>}$$

Photographing lenses are embodied based on various designs according to exemplary embodiments of the inventive concept as shown below.

In the below embodiments, lens surface numbers S1, S2, S3, . . . , and Sn are sequentially allocated from the object side O to the image side I. Furthermore, EFL denotes focal length of a photographing lens, FoV denotes field of view of the photographing lens, R denotes curvature radius of the photographing lens, Dn denotes thickness of the photographing lens or a gap between lenses, Nd denotes refractive index of the photographing lens, and Vd denotes the Abbe's number of the photographing lens. ST denotes an iris, and * denotes an aspheric surface.

First Embodiment

FIG. 1 is a diagram showing a photographing lens according to a first embodiment, where design data according to the first embodiment is shown below.

EFL=1.678 mm; F-number=1.95; FoV=93 degree

TABLE 1

| Lens Surface | R(mm) | Dn(mm) | Nd | Vd | Effective Aperture(mm) |
|---|---|---|---|---|---|
| S1* | 5.426 | 0.316 | 1.636 | 23.9 | 1.8 |
| S2* | 5.258 | 0.422 | | | 1.5 |
| ST | infinity | 0.000 | | | 0.8 |
| S4* | 5.000 | 0.481 | 1.545 | 56.1 | 0.9 |
| S5* | −1.257 | 0.030 | | | 1.1 |
| S6* | 127.960 | 0.201 | 1.636 | 23.9 | 1.3 |
| S7* | 1.588 | 0.183 | | | 1.5 |
| S8* | −4.851 | 0.799 | 1.545 | 56.1 | 1.6 |
| S9* | −0.587 | 0.174 | | | 1.9 |
| S10* | 1.706 | 0.389 | 1.636 | 23.9 | 2.7 |
| S11* | 0.549 | 0.322 | | | 3.2 |
| S12 | infinity | 0.110 | 1.517 | 64.2 | 3.2 |
| S13 | infinity | 0.276 | | | 3.3 |
| IMG | | 0.020 | | | 3.5 |

Aspheric coefficients according to the first embodiment are shown below.

TABLE 2

| Lens Surface | R | K | A1 | A2 | A3 | A4 | A5 | A6 |
|---|---|---|---|---|---|---|---|---|
| S1* | 5.426 | 2.94E+01 | 1.91E−01 | −1.83E−01 | 4.45E−01 | −9.54E−01 | 1.06E+00 | −5.37E−01 |
| S2* | 5.258 | 1.03E+01 | 3.33E−01 | −6.47E−02 | −1.24E+00 | 5.14E+00 | −9.57E+00 | 5.84E+00 |
| S3* | 5.000 | −2.49E+01 | −7.94E−02 | −1.57E−01 | −2.98E+00 | 4.34E+00 | −2.11E+00 | −6.50E−07 |
| S4* | −1.257 | −9.60E+00 | −5.22E−02 | −3.30E+00 | 1.34E+01 | −1.77E+01 | −2.02E+01 | 5.44E+01 |
| S5* | 127.960 | 9.90E+01 | −1.74E−01 | −2.03E+00 | 7.27E+00 | −2.46E+00 | −1.59E+01 | 1.84E+01 |
| S6* | 1.588 | 2.79E+00 | −6.26E−01 | 6.11E−01 | −6.28E−01 | −5.67E−01 | 3.65E+00 | −4.21E+00 |
| S7* | −4.851 | 2.88E+01 | 3.52E−02 | 3.10E−01 | −1.07E+00 | 2.10E+00 | −1.24E+00 | 1.38E−01 |
| S8* | −0.587 | −6.65E−01 | 6.63E−01 | −6.43E−01 | 7.02E−01 | −3.72E−02 | −4.27E−01 | 5.71E−01 |
| S10* | 1.706 | −3.72E+01 | −4.16E−02 | −6.50E−02 | 2.97E−02 | 9.34E−03 | −9.16E−03 | 2.16E−03 |
| S11* | 0.549 | −4.73E+00 | −1.59E−01 | 1.42E−01 | −1.16E−01 | 5.68E−02 | −1.56E−02 | 1.83E−03 |

FIG. 2 is a diagram showing longitudinal spherical aberration, astigmatic field curves, and distortion of a photographing lens according to the first embodiment. The astigmatic field curves include a tangential field curvature (T) and a sagittal field curvature (S).

Second Embodiment

FIG. 3 is a diagram showing a photographing lens according to a second embodiment, where design data according to the second embodiment is shown below.

EFL=1.655 mm; F-number=1.95; FoV=93 degree

TABLE 3

| Lens Surface | R(mm) | Dn(mm) | Nd | Vd | Effective Aperture(mm) |
|---|---|---|---|---|---|
| S1* | 2.685 | 0.230 | 1.545 | 56.1 | 1.9 |
| S2* | 1.197 | 0.312 | | | 1.4 |
| S3* | 1.113 | 0.413 | | | 1.2 |
| S4* | −11.014 | 0.030 | 1.545 | 56.1 | 0.9 |
| ST | infinity | 0.238 | | | 0.8 |
| S6* | −4.484 | 0.200 | 1.636 | 23.9 | 1.0 |
| S7* | 3.773 | 0.030 | | | 1.4 |
| S8* | 7.935 | 1.045 | 1.545 | 56.1 | 1.6 |
| S9* | −0.612 | 0.169 | | | 1.9 |
| S10* | 1.452 | 0.350 | 1.636 | 23.9 | 2.4 |
| S11* | 0.544 | 0.332 | | | 3.2 |
| S12 | infinity | 0.110 | 1.517 | 64.2 | 3.3 |
| S13 | infinity | 0.286 | | | 3.3 |
| IMG | | 0.004 | | | 3.5 |

Aspheric coefficients according to the second embodiment are shown below.

FIG. 4 is a diagram showing longitudinal spherical aberration, astigmatic field curves, and distortion of a photographing lens according to the second embodiment.

Third Embodiment

FIG. 5 is a diagram showing a photographing lens according to a third embodiment, where design data according to the third embodiment is shown below.

EFL=1.612 mm; F-number=1.94 FoV=93 degree

TABLE 5

| Lens Surface | R(mm) | Dn(mm) | Nd | Vd | Effective Aperture(mm) |
|---|---|---|---|---|---|
| 1* | 3.402 | 0.350 | 1.636 | 23.9 | 1.9 |
| 2* | 3.248 | 0.393 | | | 1.5 |
| ST | infinity | 0.045 | | | 0.8 |
| 4* | −100.000 | 0.367 | 1.545 | 56.1 | 0.8 |
| 5* | −1.035 | 0.030 | | | 1.0 |
| 6* | 10.330 | 0.261 | 1.636 | 23.9 | 1.2 |
| 7* | 1.512 | 0.208 | | | 1.4 |
| 8* | −6.854 | 0.850 | 1.545 | 56.1 | 1.6 |
| 9* | −0.597 | 0.121 | | | 1.9 |
| 10* | 1.413 | 0.380 | 1.636 | 23.9 | 2.6 |
| 11* | 0.514 | 0.315 | | | 3.1 |
| 12 | infinity | 0.110 | 1.517 | 64.2 | 3.2 |
| 13 | infinity | 0.240 | | | 3.2 |
| IMG | | 0.054 | | | 3.5 |

Aspheric coefficients according to the third embodiment are shown below.

TABLE 4

| Lens Surface | R | K | A1 | A2 | A3 | A4 | A5 | A6 |
|---|---|---|---|---|---|---|---|---|
| S1* | 2.685 | 5.42E+00 | 9.62E−02 | −6.09E−02 | −1.18E−01 | 6.66E−03 | 1.24E−01 | −1.05E−01 |
| S2* | 1.197 | 4.85E−01 | 2.21E−01 | 3.01E−01 | −9.39E−01 | 1.17E+00 | −3.00E−04 | −1.98E−02 |
| S3* | 1.113 | 1.88E+00 | −6.92E−02 | 2.58E−01 | −1.29E+00 | 1.18E+00 | 1.51E−02 | −6.00E−02 |
| S4* | −11.014 | 0.00E+00 | −8.40E−02 | 5.83E−01 | −2.59E+00 | 8.79E+00 | −2.00E−04 | −1.00E−05 |
| S6* | −4.484 | 5.00E+01 | −6.96E−01 | 1.11E+00 | −5.81E+00 | 4.17E+00 | 2.00E−05 | 0.00E+00 |
| S7* | 3.773 | 0.00E+00 | −4.15E−01 | 1.09E+00 | −1.88E+00 | 1.23E+00 | −4.97E−03 | 1.00E−05 |
| S8* | 7.935 | 0.00E+00 | −7.52E−02 | 2.81E−01 | −2.40E−01 | −1.45E−01 | 2.27E−01 | −2.09E−02 |
| S9* | −0.612 | −2.28E+00 | −2.41E−01 | −6.38E−02 | 1.85E+00 | −2.84E−01 | 1.44E−01 | 5.88E−02 |
| S10* | 1.452 | −2.13E+01 | −1.04E−01 | −1.76E−01 | 1.67E−01 | −2.74E−02 | −1.54E−02 | 0.00E+00 |
| S11* | 0.544 | −4.11E+00 | −1.48E−01 | 5.21E−02 | −1.32E−02 | 4.08E−03 | −2.01E−03 | 2.80E−04 |

TABLE 6

| Lens Surface | R | K | A1 | A2 | A3 | A4 | A5 | A6 |
|---|---|---|---|---|---|---|---|---|
| 1* | 3.402 | 1.04E+01 | 1.39E-01 | -1.63E-01 | 4.87E-01 | -1.03E+00 | 1.12E+00 | -5.58E-01 |
| 2* | 3.248 | -7.02E+00 | 3.03E-01 | 6.72E-02 | -1.32E+00 | 5.37E+00 | -1.03E+01 | 6.33E+00 |
| 4* | -100.000 | 0.00E+00 | -3.58E-01 | 4.02E-01 | -5.12E+00 | -1.39E+00 | -2.26E+00 | -7.00E-07 |
| 5* | -1.035 | -8.83E+00 | -3.51E-01 | -3.55E+00 | 1.87E+01 | -3.25E+01 | -2.16E+01 | 5.90E+01 |
| 6* | 10.330 | 0.00E+00 | -1.19E-02 | -1.68E+00 | 6.09E+00 | -2.46E+00 | -1.70E+01 | 1.99E+01 |
| 7* | 1.512 | 2.37E+00 | -5.09E-01 | 4.87E-01 | -6.43E-01 | -7.24E-01 | 3.91E+00 | -4.62E+00 |
| 8* | -6.854 | 5.59E+01 | -2.16E-02 | 4.12E-01 | -1.11E+00 | 1.95E+00 | -1.30E+00 | 1.79E-01 |
| 9* | -0.597 | -6.73E-01 | 6.41E-01 | -6.59E-01 | 7.24E-01 | -4.59E-02 | -4.75E-01 | 4.92E-01 |
| 10* | 1.413 | -3.04E+01 | -9.42E-02 | -5.06E-02 | 3.27E-02 | 9.27E-03 | -9.60E-03 | 2.34E-03 |
| 11* | 0.514 | -4.50E+00 | -1.72E-01 | 1.37E-01 | -1.14E-01 | 5.71E-02 | -1.54E-02 | 1.74E-03 |

FIG. 6 is a diagram showing longitudinal spherical aberration, astigmatic field curves, and distortion of a photographing lens according to the third embodiment.

Fourth Embodiment

FIG. 7 is a diagram showing a photographing lens according to a fourth embodiment, where design data according to the fourth embodiment is shown below.

EFL=1.777 mm; F-number=1.95; FoV=88 degree

TABLE 7

| Lens Surface | R(mm) | Dn(mm) | Nd | Vd | Effective Aperture(mm) |
|---|---|---|---|---|---|
| S1* | -5.036 | 0.296 | 1.545 | 56.1 | 1.5 |
| S2* | -1.605 | 0.085 | | | 1.3 |
| ST | infinity | 0.000 | | | 0.9 |
| S4* | -20.210 | 0.394 | 1.545 | 56.1 | 0.9 |
| S5* | -1.501 | 0.030 | | | 1.2 |
| S6* | -500.000 | 0.210 | 1.636 | 23.9 | 1.3 |
| S7* | 2.241 | 0.423 | | | 1.4 |
| S8* | -2.641 | 0.630 | 1.545 | 56.1 | 1.7 |
| S9* | -0.594 | 0.042 | | | 1.8 |
| S10* | 1.254 | 0.358 | 1.611 | 26.2 | 2.5 |
| S11* | 0.466 | 0.358 | | | 3.1 |
| S12 | infinity | 0.110 | 1.517 | 64.2 | 3.2 |
| S13 | infinity | 0.264 | | | 3.2 |
| IMG | | 0.030 | | | 3.5 |

Aspheric coefficients according to the fourth embodiment are shown below.

TABLE 8

| Lens Surface | R | K | A1 | A2 | A3 | A4 | A5 | A6 |
|---|---|---|---|---|---|---|---|---|
| S1* | -5.036 | -5.25E+01 | -6.82E-02 | 6.25E-02 | 1.72E-01 | -1.37E+00 | 1.24E+00 | 2.47E-01 |
| S2* | -1.605 | -2.11E+01 | 1.54E-01 | -3.72E-01 | -1.30E+00 | 2.65E+00 | -2.68E-01 | -4.77E-01 |
| S4* | -20.210 | -3.91E+01 | 6.49E-01 | -2.25E+00 | -4.03E+00 | 1.35E+01 | -2.11E+00 | -7.30E-07 |
| S5* | -1.501 | 1.11E-01 | 2.53E-02 | -2.53E+00 | 8.93E+00 | -1.13E+01 | -1.75E+01 | 5.44E+01 |
| S6* | -500.000 | 9.90E+01 | -3.64E-01 | 3.19E-02 | 6.77E-01 | 9.58E+00 | -2.49E+01 | 1.79E+01 |
| S7* | 2.241 | 4.87E+00 | -3.24E-01 | 3.06E-01 | 2.65E-02 | -7.04E-01 | 2.74E+00 | -2.94E+00 |
| S8* | -2.641 | 7.91E+00 | 1.26E-02 | 2.55E-01 | -1.10E+00 | 2.67E+00 | -2.45E+00 | 1.25E+00 |
| S9* | -0.594 | -7.42E-01 | 7.84E-01 | -1.07E+00 | 1.08E+00 | 6.40E-02 | -9.58E-01 | 8.29E-01 |
| S10* | 1.254 | -2.21E+01 | -1.04E-01 | -1.17E-01 | 1.59E-01 | -4.96E-02 | -1.85E-02 | 1.08E-02 |
| S11* | 0.466 | -3.97E+00 | -2.11E-01 | 1.98E-01 | -1.58E-01 | 8.05E-02 | -2.35E-02 | 2.92E-03 |

FIG. 8 is a diagram showing longitudinal spherical aberration, astigmatic field curves, and distortion of a photographing lens according to the fourth embodiment.

Fifth Embodiment

FIG. 9 is a diagram showing a photographing lens according to a fifth embodiment, where design data according to the fifth embodiment is shown below.

EFL=1.68 mm; F-number=1.95; FoV=93 degree

TABLE 9

| Lens Surface | R(mm) | Dn(mm) | Nd | Vd | Effective Aperture(mm) |
|---|---|---|---|---|---|
| 1* | 8.582 | 0.417 | 1.611 | 26.2 | 1.9 |
| 2* | 25.964 | 0.344 | | | 1.5 |
| ST | infinity | 0.000 | | | 0.8 |
| 4* | 5.477 | 0.415 | 1.545 | 56.1 | 0.8 |
| 5* | -1.416 | 0.030 | | | 1.1 |
| 6* | 65.883 | 0.200 | 1.636 | 23.9 | 1.3 |
| 7* | 1.655 | 0.173 | | | 1.5 |
| 8* | -3.678 | 0.804 | 1.545 | 56.1 | 1.6 |
| 9* | -0.567 | 0.059 | | | 1.8 |
| 10* | 2.493 | 0.588 | 1.636 | 23.9 | 2.6 |
| 11* | 0.613 | 0.308 | | | 3.2 |
| 12 | infinity | 0.110 | 1.517 | 64.2 | 3.2 |
| 13 | infinity | 0.259 | | | 3.3 |
| IMG | | 0.036 | | | 3.5 |

Aspheric coefficients according to the fifth embodiment are shown below.

TABLE 10

| | | | | | | | | |
|---|---|---|---|---|---|---|---|---|
| S1* | 8.582 | 7.25E+01 | 1.15E−01 | −1.47E−01 | 4.22E−01 | −9.58E−01 | 1.01E+00 | −4.36E−01 |
| S2* | 25.964 | 9.90E+01 | 2.54E−01 | −5.64E−02 | −1.57E+00 | 5.28E+00 | −8.23E+00 | 4.67E+00 |
| S4* | 5.477 | −3.93E+01 | −8.85E−02 | 4.82E−01 | −5.69E+00 | 6.72E+00 | −2.11E+00 | 4.00E−04 |
| S5* | −1.416 | −1.39E+01 | −2.92E−01 | −2.96E+00 | 1.51E+01 | −2.14E+01 | −2.02E+01 | 5.44E+01 |
| S6* | 65.883 | −9.90E+01 | −4.79E−01 | −1.78E+00 | 8.45E+00 | −2.54E+00 | −1.94E+01 | 1.84E+01 |
| S7* | 1.655 | 2.86E+00 | −6.55E−01 | 6.81E−01 | −4.64E−01 | −6.38E−01 | 3.16E+00 | −3.70E+00 |
| S8* | −3.678 | 1.48E+01 | 1.09E−01 | 2.43E−01 | −9.59E−01 | 2.13E+00 | −1.26E+00 | −2.36E−02 |
| S9* | −0.567 | −7.17E−01 | 6.39E−01 | −6.30E−01 | 6.94E−01 | −1.36E−01 | −5.80E−01 | 8.17E−01 |
| S10* | 2.493 | −8.44E+01 | 1.08E−02 | −7.85E−02 | 6.93E−03 | 1.35E−02 | −2.73E−03 | 7.30E−04 |
| S11* | 0.613 | −5.64E+00 | −1.29E−01 | 1.33E−01 | −1.14E−01 | 5.42E−02 | −1.44E−02 | 1.67E−03 |

FIG. 10 is a diagram showing longitudinal spherical aberration, astigmatic field curves, and distortion of a photographing lens according to the fifth embodiment.

Sixth Embodiment

FIG. 11 is a diagram showing a photographing lens according to a sixth embodiment, where design data according to the sixth embodiment is shown below.

EFL=1.542 mm; F-number=1.8; FoV=96 degree

TABLE 11

| Lens Surface | R(mm) | Dn(mm) | Nd | Vd | Effective Aperture(mm) |
|---|---|---|---|---|---|
| S1* | 5.079 | 0.359 | 1.636 | 23.9 | 1.9 |
| S2* | 5.407 | 0.369 | | | 1.4 |
| ST | infinity | 0.000 | | | 0.8 |
| S4* | 45.079 | 0.460 | 1.545 | 56.1 | 0.9 |
| S5* | −0.911 | 0.032 | | | 1.1 |
| S6* | −6.134 | 0.206 | 1.636 | 23.9 | 1.2 |
| S7* | 1.778 | 0.149 | | | 1.5 |
| S8* | −4.568 | 0.997 | 1.545 | 56.1 | 1.6 |
| S9* | −0.602 | 0.030 | | | 2.0 |
| S10* | 0.771 | 0.300 | 1.636 | 23.9 | 2.9 |
| S11* | 0.406 | 0.438 | | | 3.2 |
| S12 | infinity | 0.110 | 1.517 | 64.2 | 3.3 |
| S13 | infinity | 0.275 | | | 3.3 |
| IMG | | 0.025 | | | 3.5 |

Aspheric coefficients according to the sixth embodiment are shown below.

TABLE 12

| | | | | | | | | |
|---|---|---|---|---|---|---|---|---|
| S1* | 5.079 | 2.10E+01 | 1.86E−01 | −1.63E−01 | 4.81E−01 | −9.31E−01 | 1.05E+00 | −4.94E−01 |
| S2* | 5.407 | 2.05E+01 | 3.44E−01 | −4.91E−02 | −1.03E+00 | 5.63E+00 | −9.57E+00 | 4.14E+00 |
| S4* | 45.079 | 9.90E+01 | −1.57E−01 | −3.07E−01 | −4.19E+00 | −1.87E+00 | −2.11E+00 | −6.50E−07 |
| S5* | −0.911 | −4.15E+00 | −2.77E−01 | −3.65E+00 | 1.31E+01 | −2.02E+01 | −2.05E+01 | 5.44E+01 |
| S6* | −6.134 | 7.45E+01 | −3.55E−01 | −2.17E+00 | 6.58E+00 | −3.72E+00 | −9.42E+00 | 1.86E+01 |
| S7* | 1.778 | 2.48E+00 | −6.55E−01 | 5.81E−01 | −6.60E−01 | −6.29E−01 | 3.48E+00 | −4.17E+00 |
| S8* | −4.568 | 2.80E+01 | 8.62E−02 | 1.62E−01 | −1.10E+00 | 2.07E+00 | −1.21E+00 | 2.39E−01 |
| S9* | −0.602 | −6.84E−01 | 6.07E−01 | −6.57E−01 | 7.17E−01 | −6.93E−02 | −5.13E−01 | 4.81E−01 |
| S10* | 0.771 | −5.96E+00 | −9.09E−02 | −5.76E−02 | 3.10E−02 | 9.51E−03 | −9.31E−03 | 1.91E−03 |
| S11* | 0.406 | −3.02E+00 | −1.98E−01 | 1.52E−01 | −1.18E−01 | 5.59E−02 | −1.46E−02 | 1.61E−03 |

FIG. 12 is a diagram showing longitudinal spherical aberration, astigmatic field curves, and distortion of a photographing lens according to the sixth embodiment.

Seventh Embodiment

FIG. 13 is a diagram showing a photographing lens according to a seventh embodiment, where design data according to the seventh embodiment is shown below.

EFL=1.593 mm; F-number=1.7 FoV=95 degree

TABLE 13

| Lens Surface | R(mm) | Dn(mm) | Nd | Vd | Effective Aperture(mm) |
|---|---|---|---|---|---|
| S1* | 4.548 | 0.401 | 1.636 | 23.9 | 1.9 |
| S2* | 4.623 | 0.328 | | | 1.4 |
| ST | infinity | 0.000 | | | 0.9 |
| S4* | 9.630 | 0.510 | 1.545 | 56.1 | 0.9 |
| S5* | −0.995 | 0.030 | | | 1.2 |
| S6* | −5.638 | 0.200 | 1.636 | 23.9 | 1.3 |
| S7* | 2.117 | 0.146 | | | 1.6 |
| S8* | −6.007 | 0.934 | 1.545 | 56.1 | 1.7 |
| S9* | −0.636 | 0.030 | | | 2.0 |
| S10* | 1.155 | 0.390 | 1.636 | 23.9 | 2.6 |
| S11* | 0.511 | 0.371 | | | 3.2 |
| S12 | infinity | 0.110 | 1.517 | 64.2 | 3.2 |
| S13 | infinity | 0.271 | | | 3.3 |
| IMG | | 0.029 | | | 3.5 |

Aspheric coefficients according to the seventh embodiment are shown below.

TABLE 14

| Lens Surface | R | K | A1 | A2 | A3 | A4 | A5 | A6 |
|---|---|---|---|---|---|---|---|---|
| S1* | 4.548 | 1.65E+01 | 1.35E−01 | −1.22E−01 | 4.54E−01 | −9.56E−01 | 1.03E+00 | −4.40E−01 |
| S2* | 4.623 | 6.72E+00 | 3.09E−01 | 9.08E−02 | −1.43E+00 | 5.67E+00 | −8.19E+00 | 2.56E+00 |
| S4* | 9.630 | −3.16E+01 | −1.21E−01 | −4.43E−01 | −5.45E−01 | −5.38E+00 | −2.11E+00 | −6.50E−07 |
| S5* | −0.995 | −3.12E+00 | −4.54E−02 | −3.62E+00 | 1.31E+01 | −1.84E+01 | −2.05E+01 | 5.44E+01 |
| S6* | −5.638 | 6.39E+01 | −3.09E−01 | −1.73E+00 | 6.29E+00 | −5.53E+00 | −7.62E+00 | 1.86E+01 |
| S7* | 2.117 | 3.36E+00 | −5.34E−01 | 4.87E−01 | −6.07E−01 | −4.79E−01 | 3.38E+00 | −4.46E+00 |
| S8* | −6.007 | 3.58E+01 | 1.34E−01 | 1.25E−01 | −1.10E+00 | 2.08E+00 | −1.17E+00 | 8.67E−02 |
| S9* | −0.636 | −6.48E−01 | 6.03E−01 | −6.27E−01 | 7.08E−01 | −5.03E−02 | −4.84E−01 | 4.54E−01 |
| S10* | 1.155 | −1.17E+01 | −4.04E−02 | −1.23E−01 | 6.02E−02 | 1.56E−03 | −1.31E−02 | 4.85E−03 |
| S11* | 0.511 | −3.87E+00 | −1.47E−01 | 1.20E−01 | −1.10E−01 | 5.91E−02 | −1.74E−02 | 2.10E−03 |

FIG. 14 is a diagram showing longitudinal spherical aberration, astigmatic field curves, and distortion of a photographing lens according to the seventh embodiment.

Eighth Embodiment

FIG. 15 is a diagram showing a photographing lens according to an eighth embodiment, where design data according to the eighth embodiment is shown below.

EFL=1.458 mm; F-number=1.95 FoV=100 degree

TABLE 15

| Lens Surface | R(mm) | Dn(mm) | Nd | Vd | Effective Aperture(mm) |
|---|---|---|---|---|---|
| S1* | 5.518 | 0.345 | 1.636 | 23.9 | 1.9 |
| S2* | 4.549 | 0.367 | | | 1.5 |
| ST | infinity | 0.000 | | | 0.7 |
| S4* | 50.144 | 0.428 | 1.545 | 56.1 | 0.7 |
| S5* | −0.910 | 0.030 | | | 1.1 |
| S6* | −8.009 | 0.200 | 1.636 | 23.9 | 1.2 |
| S7* | 1.808 | 0.071 | | | 1.7 |
| S8* | −6.173 | 1.023 | 1.545 | 56.1 | 1.6 |
| S9* | −0.592 | 0.047 | | | 1.9 |
| S10* | 0.888 | 0.322 | 1.636 | 23.9 | 2.7 |
| S11* | 0.433 | 0.386 | | | 3.1 |
| S12 | infinity | 0.110 | 1.517 | 64.2 | 3.2 |
| S13 | infinity | 0.277 | | | 3.3 |
| IMG | | 0.023 | | | 3.5 |

Aspheric coefficients according to the eighth embodiment are shown below.

TABLE 16

| Lens Surface | R | K | A1 | A2 | A3 | A4 | A5 | A6 |
|---|---|---|---|---|---|---|---|---|
| S1* | 4.548 | 1.65E+01 | 1.35E−01 | −1.22E−01 | 4.54E−01 | −9.56E−01 | 1.03E+00 | −4.40E−01 |
| S2* | 4.623 | 6.72E+00 | 3.09E−01 | 9.08E−02 | −1.43E+00 | 5.67E+00 | −8.19E+00 | 2.56E+00 |
| S4* | 9.630 | −3.16E+01 | −1.21E−01 | −4.43E−01 | −5.45E−01 | −5.38E+00 | −2.11E+00 | −6.50E−07 |
| S5* | −0.995 | −3.12E+00 | −4.54E−02 | −3.62E+00 | 1.31E+01 | −1.84E+01 | −2.05E+01 | 5.44E+01 |
| S6* | −5.638 | 6.39E+01 | −3.09E−01 | −1.73E+00 | 6.29E+00 | −5.53E+00 | −7.62E+00 | 1.86E+01 |
| S7* | 2.117 | 3.36E+00 | −5.34E−01 | 4.87E−01 | −6.07E−01 | −4.79E−01 | 3.38E+00 | −4.46E+00 |
| S8* | −6.007 | 3.58E+01 | 1.34E−01 | 1.25E−01 | −1.10E+00 | 2.08E+00 | −1.17E+00 | 8.67E−02 |
| S9* | −0.636 | −6.48E−01 | 6.03E−01 | −6.27E−01 | 7.08E−01 | −5.03E−02 | −4.84E−01 | 4.54E−01 |
| S10* | 1.155 | −1.17E+01 | −4.04E−02 | −1.23E−01 | 6.02E−02 | 1.56E−03 | −1.31E−02 | 4.85E−03 |
| S11* | 0.511 | −3.87E+00 | −1.47E−01 | 1.20E−01 | −1.10E−01 | 5.91E−02 | −1.74E−02 | 2.10E−03 |

FIG. 16 is a diagram showing longitudinal spherical aberration, astigmatic field curves, and distortion of a photographing lens according to the eighth embodiment.

Ninth Embodiment

FIG. 17 is a diagram showing a photographing lens according to a ninth embodiment, where design data according to the ninth embodiment is shown below.

EFL=1.332 mm; F-number=1.95; FoV=105 degree

TABLE 17

| Lens Surface | R(mm) | Dn(mm) | Nd | Vd | Effective Aperture(mm) |
|---|---|---|---|---|---|
| S1* | 6.318 | 0.347 | 1.636 | 23.9 | 1.9 |
| S2* | 4.496 | 0.334 | | | 1.5 |
| ST | infinity | 0.000 | | | 0.7 |
| S4* | −14.982 | 0.410 | 1.545 | 56.1 | 0.7 |
| S5* | −0.830 | 0.030 | | | 1.0 |
| S6* | −6.257 | 0.200 | 1.636 | 23.9 | 1.2 |
| S7* | 1.984 | 0.071 | | | 1.7 |
| S8* | −4.809 | 0.932 | 1.545 | 56.1 | 1.6 |
| S9* | −0.575 | 0.030 | | | 1.9 |
| S10* | 0.798 | 0.300 | 1.636 | 23.9 | 2.7 |
| S11* | 0.423 | 0.385 | | | 3.0 |
| S12 | infinity | 0.110 | 1.517 | 64.2 | 3.1 |
| S13 | infinity | 0.278 | | | 3.2 |
| IMG | | 0.022 | | | 3.5 |

Aspheric coefficients according to the ninth embodiment are shown below.

TABLE 18

| Lens Surface | R | K | A1 | A2 | A3 | A4 | A5 | A6 |
|---|---|---|---|---|---|---|---|---|
| S1* | 6.318 | 3.61E+01 | 2.59E−01 | −2.21E−01 | 5.13E−01 | −9.06E−01 | 1.05E+00 | −4.91E−01 |
| S2* | 4.496 | 3.67E+01 | 4.41E−01 | −2.40E−01 | −9.25E−01 | 6.13E+00 | −9.45E+00 | 6.48E−01 |
| S4* | −14.982 | 3.33E+01 | −3.63E−01 | −3.27E−01 | −8.21E+00 | 1.20E+01 | −2.11E+00 | −6.50E−07 |
| S5* | −0.830 | −3.87E+00 | −4.23E−01 | −3.47E+00 | 1.61E+01 | −2.67E+01 | −2.02E+01 | 5.44E+01 |
| S6* | −6.257 | 9.83E+01 | −3.80E−01 | −1.92E+00 | 7.71E+00 | −1.55E+01 | −1.51E+01 | 1.84E+01 |
| S7* | 1.984 | 3.39E+00 | −5.49E−01 | 6.25E−01 | −7.03E−01 | −6.34E−01 | 3.59E+00 | −3.36E+00 |
| S8* | −4.809 | −9.90E+01 | 1.92E−01 | 1.91E−01 | −1.08E+00 | 2.06E+00 | −1.31E+00 | 3.71E−02 |
| S9* | −0.575 | −6.62E−01 | 6.13E−01 | −5.90E−01 | 7.03E−01 | −6.32E−02 | −3.92E−01 | 7.62E−01 |
| S10* | 0.798 | −5.34E+00 | −1.94E−01 | −7.18E−02 | 3.85E−02 | −3.52E−03 | −1.35E−02 | 1.09E−02 |
| S11* | 0.423 | −2.87E+00 | −2.77E−01 | 2.11E−01 | −1.41E−01 | 5.68E−02 | −1.34E−02 | 1.55E−03 |

FIG. 18 is a diagram showing longitudinal spherical aberration, astigmatic field curves, and distortion of a photographing lens according to the ninth embodiment.

Tenth Embodiment

FIG. 19 is a diagram showing a photographing lens according to a tenth embodiment, where design data according to the tenth embodiment is shown below.
EFL=1.6485; Fno=1.95; FOV=89

TABLE 19

| Lens Surface | R(mm) | Dn(mm) | Nd | Vd | Effective Aperture(mm) |
|---|---|---|---|---|---|
| S1* | 3.402 | 0.350 | 1.636 | 23.9 | 1.9 |
| S2* | 3.248 | 0.400 | | | 1.5 |
| ST | infinity | 0.045 | | | 0.8 |
| S4* | −100.000 | 0.367 | 1.545 | 56.1 | 0.9 |
| S5* | −1.056 | 0.034 | | | 1.1 |
| S6* | 9.444 | 0.261 | 1.636 | 23.9 | 1.2 |
| S7* | 1.718 | 0.201 | | | 1.5 |
| S8* | −3.355 | 0.840 | 1.545 | 56.1 | 1.6 |
| S9* | −0.565 | 0.116 | | | 1.9 |
| S10* | 1.625 | 0.390 | 1.636 | 23.9 | 2.5 |
| S11* | 0.524 | 0.315 | | | 3.1 |
| S12 | infinity | 0.110 | 1.517 | 64.2 | 3.1 |
| S13 | infinity | 0.273 | | | 3.2 |
| IMG | | 0.027 | | | 3.5 |

Aspheric coefficients according to the tenth embodiment are shown below.

TABLE 20

| Lens Surface | R | K | A1 | A2 | A3 | A4 | A5 | A6 |
|---|---|---|---|---|---|---|---|---|
| S1* | 3.402 | 1.03E+01 | 1.37E−01 | −1.71E−01 | 4.88E−01 | −1.02E+00 | 1.10E+00 | −5.45E−01 |
| S2* | 3.248 | −7.02E+00 | 3.03E−01 | 6.72E−02 | −1.32E+00 | 5.37E+00 | −1.03E+01 | 6.33E+00 |
| S4* | −100.000 | 0.00E+00 | −3.58E−01 | 4.02E−01 | −5.12E+00 | −1.39E+00 | −2.26E+00 | −7.05E−07 |
| S5* | −1.056 | −2.10E+00 | 1.82E−01 | −3.28E+00 | 1.27E+01 | −2.06E+01 | −2.16E+01 | 5.90E+01 |
| S6* | 9.444 | 1.19E+01 | −1.99E−01 | −8.46E−01 | 3.03E+00 | 1.56E+01 | −1.70E+01 | 1.99E+01 |
| S7* | 1.718 | 3.27E+00 | −4.61E−01 | 3.68E−01 | −3.27E−01 | −8.46E−01 | 2.93E+00 | −2.85E+00 |
| S8* | −3.355 | 6.94E+00 | 9.15E−03 | 4.08E−01 | −1.04E+00 | 1.92E+00 | −1.25E+00 | 1.88E−01 |
| S9* | −0.565 | −8.17E−01 | 6.82E−01 | −8.40E−01 | 6.37E−01 | 1.85E−01 | −6.38E−01 | 4.42E−01 |
| S10* | 1.625 | −4.77E+01 | 8.57E−03 | −1.63E−01 | 6.94E−02 | 2.60E−02 | −3.30E−02 | 9.45E−03 |
| S11* | 0.524 | −5.07E+00 | −1.14E−01 | 6.78E−02 | −6.15E−02 | 3.22E−02 | −9.30E−03 | 1.18E−03 |

A photographing lens according to an embodiment may include five lenses, and aberrations of the photographing lens may be reduced by distributing the lenses according to respective refractive powers thereof, and a compact optical system may be achieved in which the entire length of the photographing lens is reduced. Furthermore, a photographing lens according to an embodiment may capture up high resolution images and may have a wide field of view. Furthermore, a photographing lens according to an embodiment may be bright.

Table 21 below shows that lenses according to the first through tenth embodiments satisfy the Expressions 1 through 11.

TABLE 21

| | First Embodiment | Second Embodiment | Third Embodiment | Fourth Embodiment | Fifth Embodiment | Sixth Embodiment | Seventh Embodiment | Eighth Embodiment | Ninth Embodiment | Tenth Embodiment |
|---|---|---|---|---|---|---|---|---|---|---|
| APE-5-MAX | 3.2 | 3.2 | 3.1 | 3.1 | 3.2 | 3.3 | 3.2 | 3.1 | 3.0 | 3.1 |
| FoV | 93 | 93 | 93 | 88 | 93 | 96 | 95 | 100 | 105 | 89 |

TABLE 21-continued

|  | First Embodiment | Second Embodiment | Third Embodiment | Fourth Embodiment | Fifth Embodiment | Sixth Embodiment | Seventh Embodiment | Eighth Embodiment | Ninth Embodiment | Tenth Embodiment |
|---|---|---|---|---|---|---|---|---|---|---|
| EFL/EPD | 1.95 | 1.95 | 1.94 | 1.95 | 1.95 | 1.80 | 1.70 | 1.95 | 1.95 | 1.90 |
| IND-L5 | 1.636 | 1.636 | 1.636 | 1.611 | 1.636 | 1.636 | 1.636 | 1.636 | 1.636 | 1.636 |
| Vd-L5 | 23.9 | 23.9 | 23.9 | 26.2 | 23.9 | 23.9 | 23.9 | 23.9 | 23.9 | 23.9 |
| |F1|/EFL | 591.8 | 2.5 | 597.8 | 2.4 | 12.4 | 59.8 | 89.7 | 32.4 | 19.8 | 606.6 |
| F2/EFL | 1.1 | 1.1 | 1.2 | 1.7 | 1.3 | 1.1 | 1.1 | 1.1 | 1.2 | 1.2 |
| T3/T2 | 0.4 | 0.5 | 0.7 | 0.5 | 0.5 | 0.4 | 0.4 | 0.5 | 0.5 | 0.7 |
| Vd3/Vd2 | 0.4 | 0.4 | 0.4 | 0.4 | 0.4 | 0.4 | 0.4 | 0.4 | 0.4 | 0.4 |
| |R41/R42| | 8.3 | 13.0 | 11.5 | 4.4 | 6.5 | 7.6 | 9.4 | 10.4 | 8.4 | 5.9 |
| IND-L3 | 1.636 | 1.636 | 1.636 | 1.636 | 1.636 | 1.636 | 1.636 | 1.636 | 1.636 | 1.636 |
| Vd-L3 | 23.9 | 23.9 | 23.9 | 23.9 | 23.9 | 23.9 | 23.9 | 23.9 | 23.9 | 23.9 |

A photographing lens according to an embodiment may be applied to a photographing apparatus employing an image sensor. a photographing lens according to an embodiment may be applied to various types of photographing apparatuses, such as a digital camera, an interchangeable-lens camera, a video camera, a mobile phone camera, and a small mobile device camera.

FIG. 21 is a diagram showing an example of a photographing apparatus 100 employing a photographing lens according to an embodiment. Although FIG. 21 shows an example in which the photographing apparatus 100 is applied to a mobile phone, the present invention is not limited thereto. The photographing apparatus 100 includes the photographing lens L and an image sensor 110 for receiving an image formed by the photographing lens L and converting the image into electric image signals. Any of the lenses described above with reference to FIGS. 1 through 20 may be employed as the photographing lens L. By incorporating a photographing lens into a photographing apparatus, such as a digital camera and a mobile phone, a photographing apparatus with a wide field of view and excellent image capturing ability may be achieved.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A photographing lens comprising:
a first lens having a positive refractive power or a negative refractive power and comprising a meniscus shape;
a second lens having a positive refractive power and being a meniscus lens having an image side surface convex toward an image side;
a third lens having a negative refractive power;
a fourth lens having a positive refractive power and having a surface convex toward the image side, the fourth lens being a biconvex lens; and
a fifth lens having a negative refractive power, having a surface concave away from the image side, and including at least one aspheric surface,
wherein the first through fifth lenses are sequentially arranged from an object side toward the image side, and
wherein the photographing lens satisfies:

$$1.332 \text{ mm} \leq EFL \leq 1.777 \text{ mm}$$

$$3.0 \text{ mm} \leq APE\text{-}L5\text{-}MAX < 4.5 \text{ mm}$$

$$80 \text{ degrees} < FoV < 160 \text{ degrees}$$

$$1.0 < EFL/EPD < 2.0$$

$$IND\text{-}L5 > 1.6$$

$$Vd\text{-}L5 < 30,$$

wherein IND-L5 denotes a refractive index of the fifth lens and Vd-L5 denotes an Abbe's number of the fifth lens, APE-L5-MAX denotes a diameter of a maximum effective aperture of the fifth lens, FoV denotes a field of view of the photographing lens, EFL denotes an effective focal length of the photographing lens, and EPD denotes a diameter of an entrance pupil of the photographing lens.

2. The photographing lens of claim 1, further comprising an iris arranged between the first lens and the third lens.

3. The photographing lens of claim 1, wherein the photographing lens satisfies:

$$|F1|/EFL > 1,$$

wherein F1 denotes a focal length of the first lens.

4. The photographing lens of claim 1, wherein the photographing lens satisfies:

$$F2/EFL < 5,$$

wherein F2 denotes a focal length of the second lens.

5. The photographing lens of claim 1, wherein the photographing lens satisfies:

$$T3/T2 < 1$$

wherein T2 denotes thickness of the second lens along an optical axis, and
T3 denotes thickness of the third lens along the optical axis.

6. The photographing lens of claim 1, wherein the photographing lens satisfies:

$$Vd3/Vd2 < 1,$$

wherein Vd2 denotes an Abbe's number of the second lens, and
Vd3 denotes an Abbe's number of the third lens.

7. The photographing lens of claim 1, wherein the photographing lens satisfies:

$$|R41/R42| > 1,$$

wherein R41 denotes a curvature radius of an object side surface of the fourth lens, and
R42 denotes a curvature radius of an image side surface of the fourth lens.

8. The photographing lens of claim 1, wherein the fifth lens comprises an object side surface convex toward the object side around an optical axis and the image side surface concave from the image side around the optical axis.

9. The photographing lens of claim 8, wherein the image side surface of the fifth lens comprises at least one inflection point.

10. The photographing lens of claim 1, wherein each of the first through fifth lenses comprises at least one aspheric surface.

11. The photographing lens of claim 1, wherein the first through fifth lenses are plastic lenses.

12. The photographing lens of claim 1, wherein the photographing lens satisfies:

IND-$L3$>1.6

$Vd$-$L3$<30, wherein IND-L3 denotes a refractive index of the third lens, and
Vd-L3 denotes an Abbe's number of the third lens.

13. The photographing lens of claim 1, wherein the first lens is meniscus shaped and is convex toward the object side or concave toward the image side.

14. A photographing apparatus comprising:
a photographing lens; and
an image sensor for receiving an image formed by the photographing lens and converting the image into electrical image signals,
wherein the photographing lens comprises:
  a first lens having a positive refractive power or a negative refractive power and comprising a meniscus shape,
  a second lens having a positive refractive power and being a meniscus lens which has an image side surface convex toward an image side,
  a third lens having a negative refractive power,
  a fourth lens having a positive refractive power and having a surface convex toward the image side, the fourth lens being a biconvex lens, and
  a fifth lens having a negative refractive power, having a surface concave away from the image side, and including at least one aspheric surface,
wherein the first through fifth lenses are sequentially arranged from an object side toward the image side, and
wherein the photographing lens satisfies:

1.332 mm≤EFL≤1.777 mm 3.0 mm≤APE-$L5$-MAX<4.5 mm 80 degrees<FoV<160 degree 1.0<EFL/EPD<2.0

IND-$L5$>1.6

$Vd$-$L5$<30, wherein IND-L5 denotes a refractive index of the fifth lens and Vd-L5 denotes an Abbe's number of the fifth lens, APE-L5-MAX denotes a diameter of a maximum effective aperture of the fifth lens, FoV denotes a field of view of the photographing lens, EFL denotes an effective focal length of the photographing lens, and EPD denotes a diameter of an entrance pupil of the photographing lens.

15. The photographing apparatus of claim 14, further comprising an iris arranged between the first lens and the third lens.

16. The photographing apparatus of claim 14, wherein the fifth lens comprises an object side surface convex toward the object side around an optical axis and the image side surface concave from the image side around the optical axis.

17. The photographing apparatus of claim 16, wherein the image side surface of the fifth lens comprises at least one inflection point.

18. The photographing apparatus of claim 14, wherein each of the first through fifth lenses comprises at least one aspheric surface.

19. The photographing apparatus of claim 14, wherein the first through fifth lenses are plastic lenses.

* * * * *